US008812274B2

(12) United States Patent
Virkar et al.

(10) Patent No.: US 8,812,274 B2
(45) Date of Patent: Aug. 19, 2014

(54) METHODS FOR MAPPING DATA INTO LOWER DIMENSIONS

(75) Inventors: Hemant Virkar, Potomac, MD (US); Karen Stark, Arlington, MA (US); Jacob Borgman, West Newbury, MA (US)

(73) Assignee: Hermant Virkar, Gaithersburg, MD (US)

( * ) Notice: Subject to any disclaimer, the term of this patent is extended or adjusted under 35 U.S.C. 154(b) by 495 days.

(21) Appl. No.: 12/767,533

(22) Filed: Apr. 26, 2010

(65) Prior Publication Data

US 2010/0274539 A1    Oct. 28, 2010

Related U.S. Application Data

(60) Provisional application No. 61/172,380, filed on Apr. 24, 2009.

(51) Int. Cl.
*G06F 17/10* (2006.01)
*G06N 3/08* (2006.01)

(52) U.S. Cl.
USPC ................................................ 703/2; 706/12

(58) Field of Classification Search
None
See application file for complete search history.

(56) References Cited

U.S. PATENT DOCUMENTS

| | | | |
|---|---|---|---|
| 6,226,408 B1 | 5/2001 | Sirosh | |
| 6,505,207 B1 | 1/2003 | Aggarwal et al. | |
| 6,882,990 B1 * | 4/2005 | Barnhill et al. | 706/16 |
| 2005/0031186 A1 | 2/2005 | Luu et al. | |
| 2006/0048007 A1 * | 3/2006 | Yuan et al. | 714/26 |
| 2008/0033899 A1 | 2/2008 | Barnhill et al. | |
| 2008/0126858 A1 | 5/2008 | Barras | |
| 2009/0132447 A1 * | 5/2009 | Milenova et al. | 706/12 |

OTHER PUBLICATIONS

Gu and Zhou, "Subspace Maximum Margin Clustering," ACM, CKIM '09 (The 18th ACM Conference on Information and Knowledge Management), Nov. 2009, pp. 1-10.*
Hamel, "Visualization of Support Vector Machines with Unsupervised Learning", Proceedingsfo the 2006 IEEE Symposium on Computational Intelligence inBioinformatics and Computational Biology, CIBCB 2006, Mar. 19, 2007, pp. 1-8.*
Burges, "A Tutorial on Support Vector Machines for Pattern Recognition", Data Mining and Knowledge Discovery, vol. 2, 1998, pp. 121-167.*

(Continued)

*Primary Examiner* — Kakali Chaki
*Assistant Examiner* — Walter Hanchak
(74) *Attorney, Agent, or Firm* — Arent Fox LLP

(57) ABSTRACT

Methods and systems for creating ensembles of hypersurfaces in high-dimensional feature spaces, and to machines and systems relating thereto. More specifically, exemplary aspects of the invention relate to methods and systems for generating supervised hypersurfaces based on user domain expertise, machine learning techniques, or other supervised learning techniques. These supervised hypersurfaces may optionally be combined with unsupervised hypersurfaces derived from unsupervised learning techniques. Lower-dimensional subspaces may be determined by the methods and systems for creating ensembles of hypersurfaces in high-dimensional feature spaces. Data may then be projected onto the lower-dimensional subspaces for use, e.g., in further data discovery, visualization for display, or database access. Also provided are tools, systems, devices, and software implementing the methods, and computers embodying the methods and/or running the software, where the methods, software, and computers utilize various aspects of the present invention relating to analyzing data.

23 Claims, 21 Drawing Sheets

(56) References Cited

OTHER PUBLICATIONS

Maszczyk and Dutch, "Support Vector Machines for Visualization and Dimensionality Reduction", from Kurhova et al. (Eds), ICANN 2008, Part I, LNCS 5163, Nov. 2008, pp. 346-356.*

Cook, Caragea, Honavar, "Visualization in Classification Problems", Proceedings in Computational Statistics: 16th Symposium 2004, Aug. 2004, pp. 1-8.*

Gu and Zhou, "Subspace Maximumum Margin Clustering," ACM, CKIM '09 (The 18th ACN Conference on Information and Knowledge Management), Nov. 2009, pp. 1-10.*

Zhang, Liu, "SVM Decision Boundary Based Discriminative Subspace Induction", Pattern Recognition, vol. 38, 2005, pp. 1746-1758.*

International Search Report dated Jul. 2, 2010, issued in International Application No. PCT/US10/32420.

* cited by examiner

Multi-stage Classification and Visualization
of Gene-Expression Data.

Above: projection of 4 stages of Alzheimer's into the optimal gene subspace
for differentiating each stage.
(red = severe  green = moderate  blue = incipient  purple = healthy)

Figure 18

Science Dashboard - Prototype | Logout | Help

Welcome Dr. Anderson! Customize

Dynamic Model Builder
New | Open

Model Alerts ▽
Gene Pattern Match Found!
Data Source: GEO

Gene List ▽
Sarcopenia
Signaling Pathway
Gene Regulation

Hypothesis Builder
New | Open

Remote Sensor Alerts ▽
Data Pattern Outside Normal

Articles You May Find Useful ▽
◁
Sarcopenia Obesity and Physical Capacity in Older Men and Women Published 4-16-09. Read More >>
Single food focus dietary guidance lessons: learned from an economic analysis of egg consumption. Published 4-14-09. Read More >>
Presence of low-grade inflammation impaired postprandial stimulation of muscle protein synthesis in old rats. Published 4-13-09. Read More >>
Mitochondrial DNA deletion and sarcopenia. Published 4-11-09. Read More >>
▽

Pathway Viewer
Alerts
Gene List Generator

Interactive Database Model ▽
Type: Sarcopenia genes
Gene Chip: U133A
Data Source: GEO

METHODS FOR MAPPING DATA INTO LOWER DIMENSIONS

RELATED APPLICATION DATA

This application claims priority under 35 U.S.C. §119 to U.S. Provisional Application No. 61/172,380 filed on Apr. 24, 2009, the contents of which are incorporated herein by reference in their entirety.

BACKGROUND OF THE INVENTION

1. Field of the Invention

Aspects of present invention generally relate to methods and systems for creating ensembles of hypersurfaces in high-dimensional feature spaces, and to machines and systems relating thereto. More specifically, exemplary aspects of the invention relate to methods and systems for generating supervised hypersurfaces based on user domain expertise, machine learning techniques, or other supervised learning techniques. These supervised hypersurfaces may optionally be combined with unsupervised hypersurfaces derived from unsupervised learning techniques. Additional exemplary aspects of the invention relate to methods and systems for generating supervised hypersurfaces based on user domain expertise, machine learning techniques, or other learning techniques. Lower-dimensional subspaces may be determined by the methods and systems for creating ensembles of hypersurfaces in high-dimensional feature spaces. Data may then be projected onto the lower-dimensional subspaces for further data discovery, visualization for display, or database access. Also provided are tools, systems, devices, and software implementing the methods, and computers embodying the methods and/or running the software, where the methods, software, and computers utilize various aspects of the present invention relating to analyzing data.

2. Description of Related Art

Large numbers of samples of large scale data are being amassed in huge data repositories. Accessing such data in a meaningful way is posing an increasing challenge both in the presentation of information to an end user and in the rapid summary of database content. Historically, the first computer accessing methods were limited to sequential views and storage of the data. A file might be contained in an ordered series of punch cards that could be read only in the physical sequence in which it was ordered. Files contained on magnetic tape were similarly limited to a single sequence of records. The advent of magnetic disk storage enabled the development of indexed sequential access methods. In this approach, an index could be constructed from a key field contained within each data record, and the physical storage of the data record could differ in sequence from the sequence reflected in its index file. Further developments included the relational database, in which any field in the data record could be used to create an index file, and the actual data records could be viewed in many separate sequences by using multiple index files, regardless of the sequence of the actual data records.

Accessing methods still remain essentially sequential since each index file is presented as an ordered series or one-dimensional list, and revealing the relationship among the data records as a simple sequence according to a key field. The complexity of large-scale data makes desirable more sophisticated methods for accessing data records that reflect the relationship among records using more than one 'key' field and expressing this greater complexity as more than a simple sequentially-ordered list.

Methods that can both access and express a more complex relationship among data records than a simple ordered list are highly desirable, particularly if such methods are intuitive and do not require advanced mathematical knowledge.

Computational tools and mathematical models have made progress in providing methods for data mining, but the details of using these tools remain largely the province of separate groups of specialists, and are not always effectively utilized in the broader community. There is a need for tools that can be intuitively used by non-mathematicians.

Complex datasets with high dimensionality pose particular challenges for analysis and accurate representation in two-dimensional graphics. The current and ongoing explosion of large-scale data in the life science and health sectors is a case in point. Computational resources required for analysis can be prohibitive, and grasping complex mathematical solutions can be difficult for experts in the data field who are not mathematicians. One approach to presentation of large-scale data has been the use of pseudo-three dimensional representations, but distortions are easily introduced when reducing the representation of high dimensional data to such a small number of dimensions. Inaccurate representations are a barrier to understanding and to data discovery. Better methods of representing high dimensional data are desirable not only to improve display methods, but to form a basis for further investigation of the data.

Among the tools that can be applied to high-dimensional data, the support vector machine is a powerful learning machine. It finds a linear separation between data classes, sometimes by mapping them into higher dimensions until a linear separation is possible. The problem posed by these high-dimensional calculations may be sidestepped via the "kernel trick", which implicitly maps the data into higher (perhaps infinite) dimensionality, but allows the use of a dot product to avoid undue calculations. Methods in common use to display large-scale data, such as data reduction by ICA or PCA, are not able to clearly illustrate the separation achieved by the learning machine. There exists a need for better display methods that make the solution of the learning machine, such as the svm, more readily interpretable. In addition to the use of the svm, other methods for analysis of high-dimensional data are possible. These methods may also suffer from similar limitations for display of their solutions graphically in only two or three dimensions, so a need exists more broadly in the field of large-scale data analysis for improved methods for display.

Actual data patterns have been used in the current state of the art to search for matches using data mining methods, but current methods suffer from limitations in the display and demonstration of inter-relationships in identified matches. Improved methods for finding patterns that are similar but not identical and to convey information about the similarities are highly desirable.

The direct incorporation of a hypothesis into a model would speed investigation and save research costs. A barrier to such inclusion is that frequently the expert in the domain being investigated is not a mathematician, and this places increased importance on ease of use as well as the visualization of a model. Another barrier can occur when the direct collection of statistical data to support the hypothesis is expensive, and a simple method of examining a model in advance of additional data collection can speed the elimination of unlikely hypotheses and focus further efforts more directly on likely hypotheses. A need exists for simpler methods of incorporating hypotheses into large-scale data models in advance of extensive research effort.

The recent increase in technologies for collecting and amassing large scale data also poses challenges for monitoring and detecting abnormalities or changes in such data. In the area of human health for example, it is possible to monitor tens of thousands of genes. A wide range of gene expression levels and patterns are consistent with a normal, healthy individual, but illness can be manifested as a change in these normal patterns. Simple rule based definitions of a normal pattern fall short of dealing with the complexity and scope of adequately handling what is normal, particularly, for example if dealing with samples containing tens of thousands of features such as found with human gene expression. In many other areas, for example geospatial, finance, or surveillance, normal data encompasses complex patterns of variation that are still normal, but abnormalities may very well be reflected by changes that go out of the bounds of a complicated set of inter-related normal levels. In many of these cases, supervised methods of detecting an abnormal condition are not possible because there may not be enough, or even any, examples of actual abnormal data.

For all of these reasons, improved methods that can detect deviations from a normal state without needing abnormal examples for training is highly desirable.

In the field of biotechnology, for example, improvements in large-scale data display, analysis and hypothesis exploration would also be useful to increase discovery from high dimensional biological/biomedical data sets, such as gene expression, protein expression, and clinical studies, where the visualization of such data is limited by current methods, and additional methods for data discovery are of particular interest for the improvement and understanding of human health. Other fields where large-scale data is collected, for example, include, but are not limited to geospatial, climate, marketing, economics and surveillance data. These and other fields would benefit from such improvements in display and discovery of large-scale data.

SUMMARY OF THE INVENTION

The present invention generally relates to methods and systems for creating ensembles of hypersurfaces in high-dimensional feature spaces, and to machines and systems relating thereto. More specifically, exemplary aspects of the invention relate to methods and systems for generating supervised hypersurfaces based on user domain expertise, machine learning techniques, or other supervised learning techniques. These supervised hypersurfaces may optionally be combined with unsupervised hypersurfaces derived from unsupervised learning techniques. Additional exemplary aspects of the invention relate to methods and systems for generating supervised hypersurfaces based on user domain expertise, machine learning techniques, or other learning techniques. Lower-dimensional subspaces may be determined by the methods and systems for creating ensembles of hypersurfaces in high-dimensional feature spaces. Data may then be projected onto the lower-dimensional subspaces for further data discovery, visualization for display, or database access. Also provided are tools, systems, devices, and software implementing the methods, and computers embodying the methods and/or running the software, where the methods, software, and computers utilize various aspects of the present invention relating to analyzing data.

It is desirable to create projections of high dimensional date into lower dimensions, not only for more accurate visualization and display, but also to enhance discovery from high dimensional data. Describing data in a lower dimensional subspace would allow this simpler space to be used as a basis for further analytical processing, facilitating the use of advanced analytical tools by reducing the burden of calculation. Expanding the variety of such methods available for use in analyzing data is therefore highly desirable.

Further, a tool or modeling method that permits the direct incorporation of a selected actual data pattern into a large-scale data model in combination with other supervised, unsupervised or hypothetical information would be desirable for creating an integrated data model for visualization and further data discovery. This would expand the methods available for exploration of large scale and be an advance in the field of large-scale data analysis.

Therefore, according to some aspects of the invention, a method for analysis of a high-dimensional feature space is provided, including (a) generating a supervised hypersurface using supervised learning techniques; (b) optionally generating an unsupervised hypersurface using unsupervised learning techniques; (c) combining the supervised hypersurface and optional unsupervised hypersurface to create a lower-dimensional subspace; projecting data from the high-dimensional feature space onto the lower-dimensional subspace; and (d) outputting the projected data into a computer memory.

According to another aspect of the invention, a computer program product for analysis of a high-dimensional feature space is provided, including (a) first computer readable program code means for generating a supervised hypersurface using supervised learning techniques; (b) second optional computer readable program code means for generating an unsupervised hypersurface using unsupervised learning techniques; (c) third computer readable program code means for combining the supervised hypersurface and optional unsupervised hypersurface to create a lower-dimensional subspace; (d) fourth computer readable program code means for projecting data from the high-dimensional feature space onto the lower-dimensional subspace; and (e) fifth computer readable program code means for outputting the projected data on an output device.

A method for projecting high-dimensional data from a high-dimensional data space onto a lower-dimensional subspace including (a) generating one or more axes from high-dimensional data, wherein said axes include at least one vector chosen from the following: a vector normal to a hypersurface in said high-dimensional data space, said hypersurface being derived using supervised means, a vector created from a hypothetical data pattern, or a vector selected from an actual data pattern; (b) optionally generating one or more axes from high-dimensional data, wherein said axes include at least one vector normal to an unsupervised hypersurface in said high-dimensional data space, said unsupervised hypersurface being derived using unsupervised means; (c) projecting the high-dimensional data onto said vectors to form lower-dimensional subspaces; and (d) outputting the lower-dimensional subspaces into a computer memory.

According to yet another aspect of the invention, a computer program product for analysis of a high-dimensional feature space is provided, including (a) first computer readable program code means for generating one or more axes from high-dimensional data, wherein said axes include at least one vector chosen from the following: a vector normal to a hypersurface in said high-dimensional data space, said hypersurface being derived using supervised means, a vector created from a hypothetical data pattern, or a vector selected from an actual data pattern; (b) second optional computer readable program code means for generating one or more axes from high-dimensional data, wherein said axes include at least one vector normal to an unsupervised hypersurface in said high-dimensional data space, said unsupervised hypersurface being derived using unsupervised means; (c) third computer readable program code means for projecting the high-dimensional data onto said vectors to form lower-dimensional subspaces; and (d) fourth computer readable program code means for outputting the lower-dimensional subspaces into a computer memory.

According to still another aspect of the invention, a graphic method of indexing a database is provided, including generating a hypersurface derived from data from a database; creating a lower-dimensional subspace from the hypersurface; projecting data from the database onto the lower-dimensional subspace to generate an index of the database; display of the index in graphic form and outputting the generated graphic index of the database into a computer memory.

According to a further aspect of the invention, a method for detecting deviations in data from a complex normal state, including the identification of which of the data features are responsible for the deviation from normal is provided, including generating hypersurfaces derived from data from a high-dimensional feature space; creating a lower-dimensional subspace from the hypersurfaces; projecting data from the high-dimensional feature space onto the lower-dimensional subspace to generate a normal model; comparison of additional data samples to the lower-dimensional subspace; identification of which data features of the compared data samples do not match the normal model and outputting the projected normal model into a computer memory. According to some aspects, the normal model is progressively generated as each example is added to the model by calculating a vector orthogonal to a hypersurface in high dimensional feature space that reflects the differences of the data features of the example from the model, and incorporating that vector into the model subspace.

Other novel features and advantages in accordance with aspects of the present invention will become apparent to those skilled in the art upon examination of the following or upon learning by practice thereof.

BRIEF DESCRIPTION OF THE DRAWINGS

For a more complete understanding of aspects of the present invention, the needs satisfied thereby, and the features and advantages thereof, reference now is made to the following description taken in connection with the accompanying drawings.

FIG. 18 is a computer screen view giving an example of a science dashboard, utilizing displays created with the methods of this invention.

DETAILED DESCRIPTION OF THE PREFERRED EMBODIMENTS

Definitions

Figure 1:
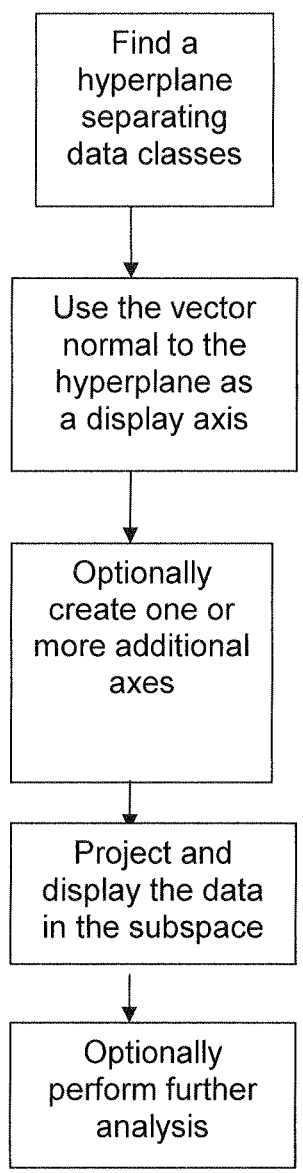
FIG. 1 is a flowchart illustrating a method of determining up to three axes to be used as a representational low-dimensional subspace for large, multi-dimensional data sets.

As used in the specification and claims, the following terms have the following meanings, unless the context of use clearly dictates otherwise:

Access Method—computer software that allows data records to be retrieved electronically.

Cloud Computing—a recent concept that describes the use of remote data and software in a manner that appears to the user to be local.

Dashboard—a computer software tool that is used to present a quick overview of the status of a business enterprise. It is modeled on an instrument panel or dashboard.

Database—a collection of computerized data records or samples, each record containing multiple data items or features.

Feature—one bit of information contained in a data sample, one element of a vector.

Feature space—the representation of data obtained by each sample of data to be a vector in multi-dimensional space, where each feature is the value of that data in one dimension.

Hypersurface—a multi-dimensional surface that may be used as a boundary or separator between data categories or classes.

Learning machine—a mathematical algorithm that can be provided with examples of two or more categories and learn to distinguish among them based on data characteristics.

Lower dimensional space—A smaller data space than the original, it may be created either by using fewer of the original data features, or by combining features into a smaller number of new features.

Machine learning—supervised mathematical methods for training algorithms to learn the differences among data categories by presenting an algorithm with examples of each category.

Normal—perpendicular to a vector or plane (mathematical sense); selected or representative of a typical state or condition.

Origin—the zero point for all dimensions in an axis system.

Orthogonal—perpendicular to another vector or plane, extending in a unique non-redundant direction with respect to a multidimensional vector or plane.

Orthonormal—orthogonal and of unit length.

Perpendicular—in a geometric sense, intersecting at a right angle (90 degrees).

Pseudo-3D—a representation of 3 dimensions (such as height, width and depth) on a flat two-dimensional surface such as a paper or computer screen.

Subspace—Any data space smaller than the original. May be a lower dimensional space that uses a smaller number of features of the original space, or may be restricted based on the values of those features. A subspace may also be of lower dimension by combining original features into a single new feature.

Supervised—a type of analysis method used that relies on the data samples having known categories.

svm—(support vector machine) a type of machine learning algorithm that can learn to classify data by finding a high dimensional hyperplane the linearly separates the data categories.

Unsupervised—a type of analysis method used when data is of unknown categories to discover what groupings occur within the data.

Vector—a mathematical element having magnitude and direction; an ordered set of numeric elements; can be used to store numeric data features for a data sample.

Aspects of the present invention generally relate to methods and systems for creating ensembles of hypersurfaces in high-dimensional feature spaces, and to machines and systems relating thereto. More specifically, exemplary aspects of the invention relate to methods and systems for generating supervised hypersurfaces based on user domain expertise, machine learning techniques, or other supervised learning techniques. These supervised hypersurfaces may optionally be combined with unsupervised hypersurfaces derived from unsupervised learning techniques. Lower-dimensional subspaces may be determined by the methods and systems for creating ensembles of hypersurfaces in high-dimensional feature spaces. Data may then be projected onto the lower-dimensional subspaces for further data discovery, visualization for display, or database access. Also provided are tools, systems, devices, and software implementing the methods, and computers embodying the methods and/or running the software, where the methods, software, and computers utilize various aspects of the present invention relating to analyzing data.

High-dimensional feature spaces may encompass data in any field, and may include, but are not limited to, geospatial data, climate data, marketing data, financial data, economic data, surveillance data, biological data, chemical data, and medical data. According to some aspects of the invention, the high dimensional data is a biological/biomedical data set, which may encompass gene expression, protein expression, and clinical study data. Visualization of such data is included as an aspect of the methods of the present invention.

A problem with high-dimensional data is posed by the fact that analysis methods usually use one of two discrete approaches. Supervised methods can be utilized when there are samples to represent two or more known categories identified in the data. Supervised methods then allow the differences between the categories to be examined. These methods include learning machines such as svms, neural networks, random forests and others obvious to those skilled in the art. Unsupervised methods can be utilized whether there are known categories in the data or not. These methods seek to discover what commonalities in the data can be used for grouping similar data samples together revealing natural categories that are present in the data. Unsupervised methods include PCA, ICA, clustering, hierarchical groupings and other means that will occur to those skilled in the art.

An unsupervised method may emphasize a different aspect of the data than a supervised method. According to some aspects, neither method alone gives as comprehensive a model of the data as is desirable. Therefore, a more complete, but still accurate model of the data can be generated by combining supervised and unsupervised methods into a single model. The use of more sophisticated combination models may advance data discovery over the use of a single type of model alone, and over the use of multiple, separate models. Accurate means for displaying these combination supervised/unsupervised models are highly desirable.

Moreover, investigators in many fields form hypotheses based on research and expertise in their respective domains. The direct incorporation of a hypothesis into a model permits advancement of discovery by allowing exploration, comparison, investigation, and possible validation of a hypothetical model. The methods, software, and tools of the present invention beneficially permit a hypothesis about large-scale data to be incorporated into a model. Some methods are available for incorporating prior statistical information into a model, for example, through the use of Bayesian methods. Methods are also available for statistical testing of hypotheses. But the modeling method of the present invention, which permits the direct incorporation of a hypothesis into a large-scale data model for visualization and further data discovery, expands the methods available for exploration of hypotheses, and represents an advance in the field of large-scale data analysis.

The present invention utilizes mathematical methods to create an ensemble of any number of hypersurfaces in high dimensional feature space. At least one of these hypersurfaces is derived from user domain expertise, or machine learning techniques, and/or other supervised techniques and may be combined or not with hypersurfaces derived from unsupervised means. Data is projected onto a lower dimensional subspace for the purposes of further data discovery and/or visualization for display and/or database access. This lower dimensional subspace is determined by these methods and the subspace may optionally be defined with a true orthonormal basis, so that no spurious structure is represented by a linearly dependent basis.

Axes orthonormal to each other may be used to create undistorted visualization of the data for visualization and display, and these axes may include the vector normal to the separating hypersurface of an svm, and/or vectors normal to any of the hypersurfaces. These displays and subspaces constitute new models of the data. FIG. 1 illustrates this aspect of the invention.

Multiple uses can be made of the lower dimensional subspaces, including, but not limited to: (1) more accurate display for representation of the svm by projection into lower dimensional space; (2) more accurate display for representation of learning machines in general (not just svm) by projection into lower dimensional space; (3) combination of (1) or (2) with unsupervised methods such as ICA/PCA into a single visual subspace model; (4) extension to include the use of a hypothetical pattern in addition to or instead of a machine learning solution in the creation of a subspace; (5) extension to incorporate an actual data pattern in addition to or instead of a machine learning solution in the creation of a subspace; (6) use of all of the above methods for data discovery in addition to display; (7) use of all of the above displays as interfaces to software and software tools; (8) iterative use of subspace creation and analysis; (9) computer infrastructure for any of these, including computers incorporated into, for example, dashboards, as well as alerts; (10) when a query or search is performed (including queries or searches described in U.S. patent application Ser. No. 12/557,344, filed on Sep. 10, 2009, the contents of which are incorporated herein by reference), these methods may be used to illustrate the results (the 3D graphical display produces a dramatic improvement over the current lists); (11) for database exploration, and discovery from data repositories, all of the samples in a database may be displayed utilizing any of the derived subspaces or axes, such that this display in itself becomes a means for further discovery that may show clustering or novel relationships among the data samples or features in the data repository/data base; (12) the display itself may also be used as an access method for the database, permitting selection and retrieval of data records; (13) the use of normal models and detection of deviations from normal for ongoing data surveillance or equipment monitoring; and (14) the use of density estimation and/or representative sampling on databases to enable the display of their shape within the created subspaces.

Figure 2:
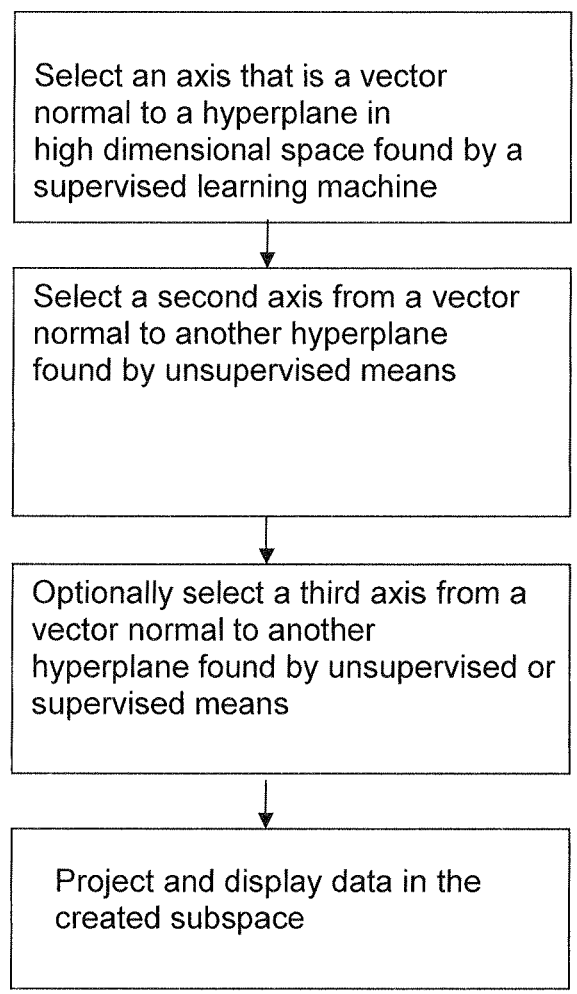
FIG. 2 is a flowchart for a method of creating a mixed data model in a subspace created by supervised and unsupervised methods.

The present invention permits improved representation of high dimensional data in lower dimensions. The invention also encompasses means for including supervised and unsupervised methods into a single data model. See FIG. 2 for the method of creation of such a data model.

The present invention also encompasses the creation of models that incorporate hypothesis-derived information into a data model. Selected actual data patterns may also be incorporated into such a data model. Allowing investigators to utilize their specialized knowledge to select data patterns that are of particular interest is a further benefit of the invention.

Figure 3:
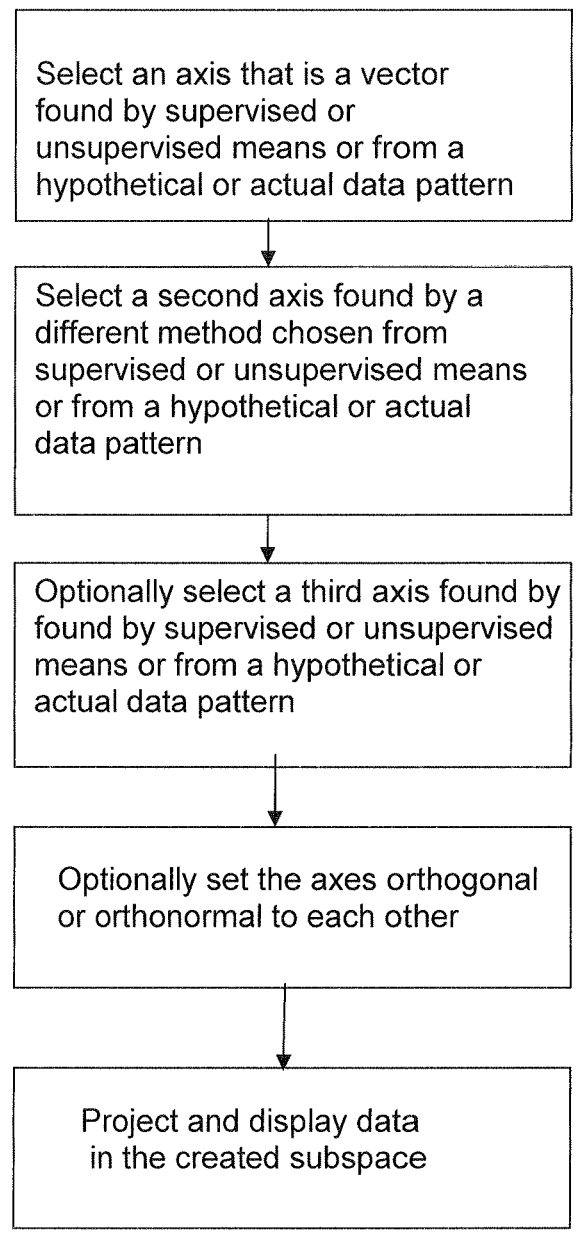
FIG. 3 is a flowchart for a method of creating a mixed data model in a subspace created two or more of the following methods in combination: supervised, unsupervised, hypothetical, or actual data patterns.

These selected data patterns may be specific examples chosen based upon an investigator's expertise. The invented data models may thus incorporate any mixed combination of supervised and unsupervised methods with hypothetical or actual data patterns. See FIG. 3 for the method of creation of such data models. The lower dimensional spaces obtained may be used for display or further data analysis. The displays in turn may be used for database access, data repository exploration, and as an interface to diverse types of software tools.

In one embodiment of the invention, the solution obtained by a machine learning method, such as but not limited to an svm, is represented as a vector and used directly to form an axis for use in a low-dimensional subspace, representative of the original data. The machine learning method may optionally encompass a reduction in the number of data features used.

Figure 4:
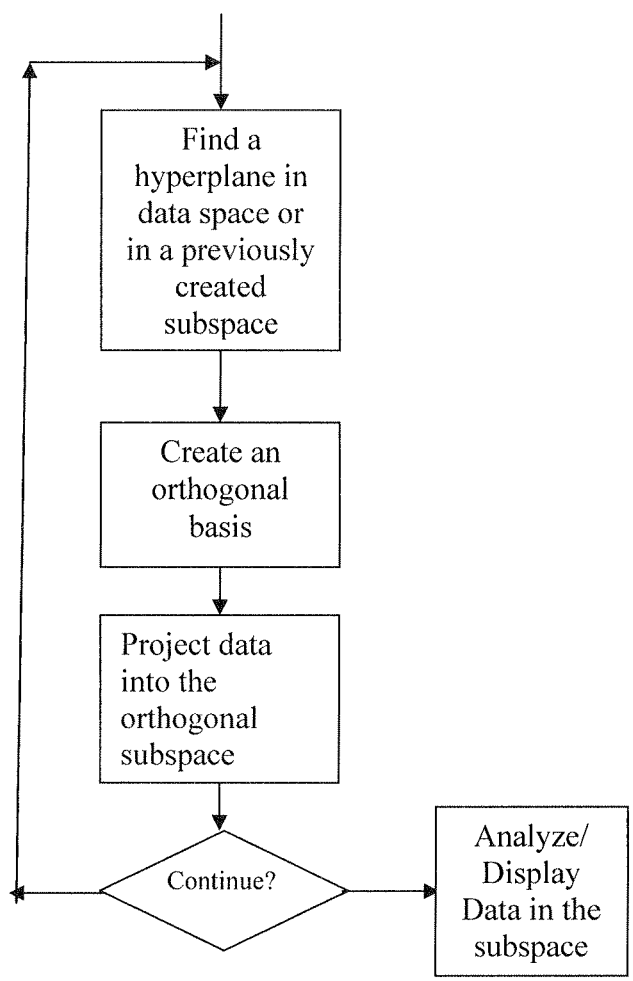
FIG. 4 is a flowchart illustrating an iterative process whereby simpler and simpler subspaces can be created for the display and further analysis of large multi-dimensional data sets.

The axis obtained from the solution of the learning machine, with or without feature reduction or selection, may be combined with one or more additional axes for data representation. The additional axes may either be derived from additional trained machines, or may be obtained by using unsupervised methods on the original data, such as, but not, limited to, ICA (independent component analysis) or PCA (principal component analysis). For accurate, non-redundant representation, the axes may be orthonormalized. The resulting lower-dimensional space obtained from the original high dimensional data may then be used for display of the original data examples used for training, and/or for new data samples. The resulting lower-dimensional space may also be used as the starting point for additional data analysis, such as the training of additional learning machines. The invented methods for obtaining lower-dimensional space may also be used iteratively in repeating cycles of modeling and analysis. See FIG. 4.

The solution to a machine learning classification problem can be mathematically defined as a vector that is orthogonal to the hyper-dimensional plane that separates the data categories. While the use of pseudo-3D displays exists in the current state of the art primarily for display of unsupervised methods, the present invention enables the use of a supervised method with accurate representation of a machine learning solution in a pseudo-3D display by using such a solution vector as one or more of the axes for the display. Moreover, this invention enables the combination of both supervised and unsupervised methods into a single data model that may be displayed or used for further data analysis.

The invention also encompasses the use of a hypothetical data pattern in addition to or instead of the use of one or more learning machines, and optionally in combination with unsupervised methods. See FIG. 3. A hypothetical data pattern may be represented as a vector, and this vector can be used as an axis or point in a display, or as part of a definition of a data subspace to be used in further analysis.

The invention also encompasses the use of an actual data pattern in the model in addition to or instead of the use of one or more learning machines or hypothetical patterns or in any combination with supervised or unsupervised methods. The actual data pattern may be selected from a collection of data samples, and may be any subset of a sample including one or more features of the data sample. The values from the actual data sample may be normalized or preprocessed. An actual data pattern may be represented as a vector or point, and this vector can be used as an axis or point in a display, or as part of a definition of a data subspace to be used in further analysis. See FIG. 3 for a method of combining an actual data pattern with other methods into a single data model.

Figure 5:
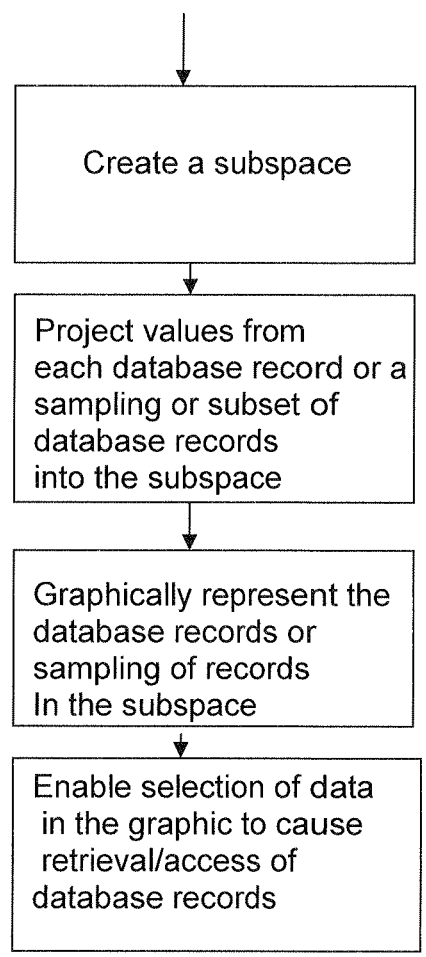
FIG. 5 is a flowchart for a method of creating a graphical display for use as a database index.

All of these types of display can be used in accordance with a novel database accessing method in which the complexity of the relationship among records in a database can be expressed as a low-dimensional spatial view of the records, not merely an ordered list. See FIG. 5 for an illustration of the creation of such a database accessing method.

Further, the present invention may take a group of any number of hypersurfaces in data space (such as, but not limited to, those defined by an svm solution or a hypothetical data pattern), and project the data samples onto a lower dimensional subspace for the purpose of further data discovery. The subspace can be represented by a true orthonormal basis, so that no spurious structure is caused by a linearly dependent basis. That is, by orthonormalizing the axes, the model can avoid the distortion introduced by including some data features into the model more than once. The lower dimensional model therefore can incorporate information obtained from supervised, unsupervised and hypothesis-driven means into a single model, simultaneously reducing the computational burden of high-dimensional, large-scale data analysis, and maintaining a more accurate data representation. See FIGS. 2 and 3 for illustrations of the methods used to create such a mixed-type data model.

The methods for creation of subspaces may also be iterated upon the same data and used to create successively smaller subspaces that are computationally more tractable. An illustration of this method is set forth in FIG. 4.

Figure 6:
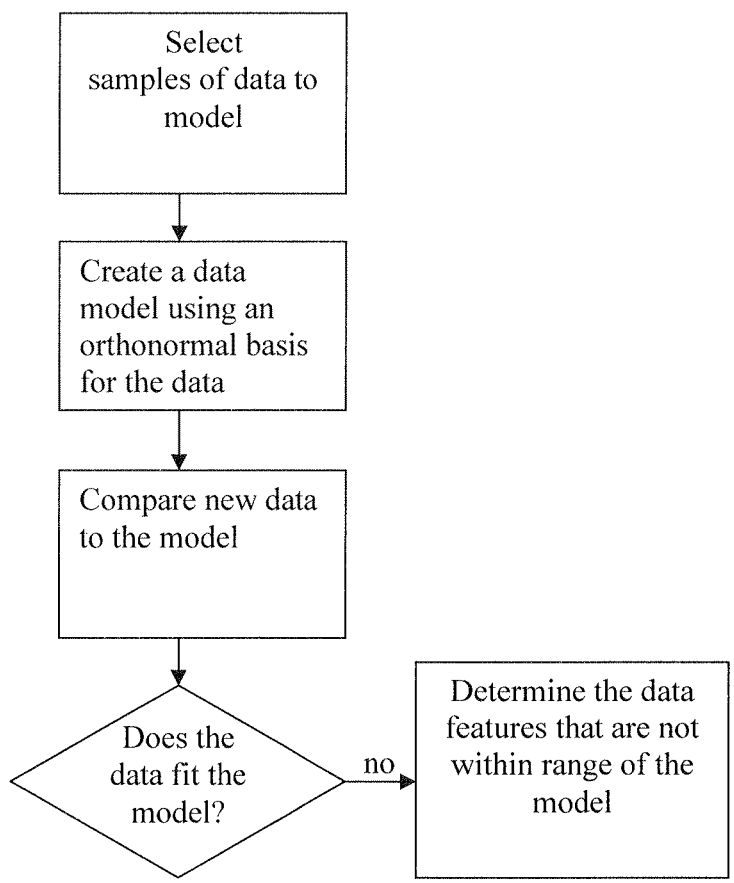
FIG. 6 is a flowchart for a method of creating a data model for data that does not have more than one category. This will create a normal model, and subsequent data may be compared to see if it fits within the normal model.

The projection of large-scale normal data into lower dimensional space can also be used to create an orthonormal lower dimensional model of normal high dimensional data that can be used to compare newly-collected data and determine if the new data fits the normal model or deviates from normal and if it deviates, which data features differ. This method can be employed even where no prior examples of abnormal data exist, and the definition of normal can vary with the problem of interest. For example, it is possible to model all human gene expression in healthy individuals across multiple tissue types. By comparing biopsied human tissue samples to the model, it is possible to able to detect a cancerous sample. Alternatively, a model of normal expression in a single tissue type could be generated, and the model used to examine how other tissues differ from it. In surveillance applications, a model can be generated from existing normal data with no preconception of how an abnormal sample might look. The model can be used on an ongoing basis to detect any changes that do not reflect the previous range of complex data patterns. See FIG. 6 for a illustration of this method to model data and detect changes.

All of the methods, software, computers, and other devices in accordance with this invention may be used to compare additional data not used in the creation of the model or subspace. This comparison may reveal new knowledge or information about the newly-compared data.

The current invention utilizes an ensemble of any number of hypersurfaces in feature space. At least one of these hypersurfaces is derived from user domain expertise, or machine learning techniques, and/or other supervised techniques and may be combined or not with hypersurfaces derived from unsupervised means. Data is projected onto a lower dimensional subspace for the purposes of further data discovery and/or visualization for display. This lower dimensional subspace is determined by these methods and the subspace may be defined with a true orthonormal basis, so that no spurious structure is represented by a linearly dependent basis. Axes orthonormal to each other are used to create undistorted visualization of the data for visualization and display, these axes may include the vector normal to the separating hypersurface of an svm, and/or vectors normal to any of the hypersurfaces.

Obtaining Subspaces and Axes for Display

The high dimensionality of the original data feature space may be due to the data itself, or to a kernel mapping or other mapping, into high dimensional space. In all cases of high dimensional data, the current invention allows for the creation of axes to improve representation of the high dimensional data in lower dimensional space.

In a preferred embodiment of the invention, an svm is used to obtain a solution by training to classify two categories of high dimensional data. The svm solution can be mathematically interpreted as a plane in high dimensional space that separates two categories. The current invention obtains an improvement in representing this separation by utilizing as an axis a vector determined by the solution of the svm, and by maintaining orthogonality between the axes used for visualization. The vector to be used is normal (orthogonal, perpendicular at the origin) to the separating plane found by the svm. Any number of mathematical adjustments, parameters or variations in how the learning machine is run can be made, but ultimately a solution vector is the result. The primary axis to be used is thus the vector that embodies the orientation of the hyper-dimensional plane separating the data categories. Using this vector as an axis in graphics of reduced dimension allows the separation achieved in high dimensional space to be proportionately shown in graphics limited to one, two or three dimensions.

Figure 11:
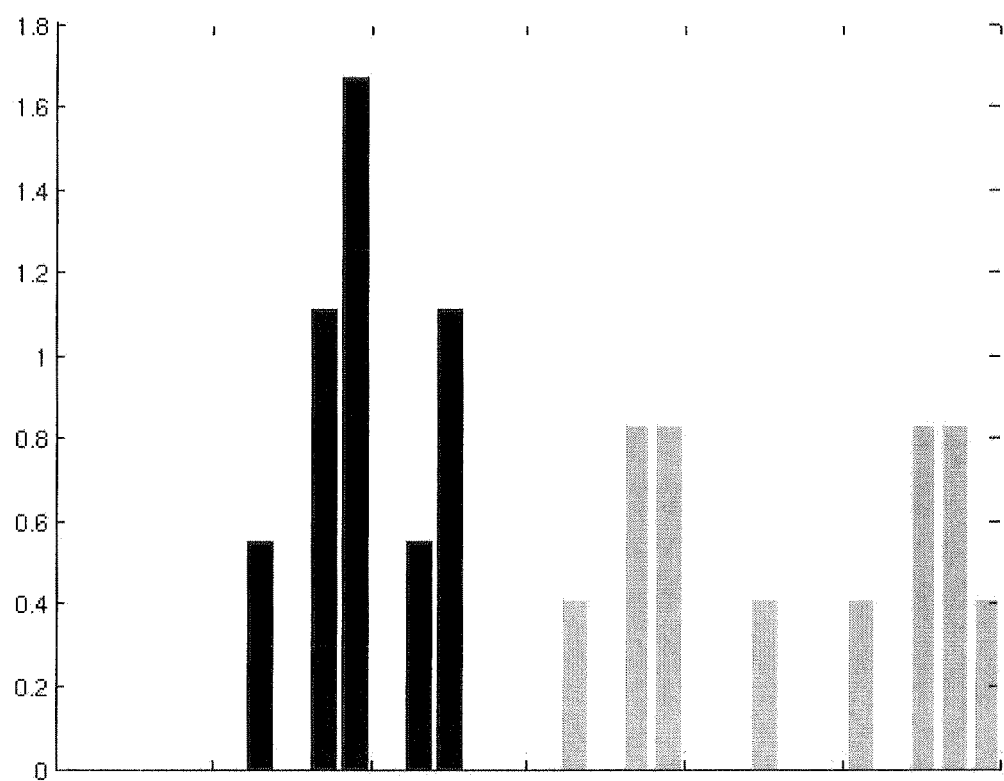
FIG. 11 is a representation of new data on an axis generated from a learning machine. This is a graphic representation of the separation between classes achieved by the learning machine. The y-axis shows the number of samples. The x-axis is a ranking. In this instance the ranking is based on the distance from the separating hyperplane, or position along the vector normal to the hyperplane. Samples classified as belonging to one class is shown in blue, the other class is shown in red.

For one dimensional representation, the vector normal to the separating hypersurface is the only axis. The data samples lie at various points along this single axis. Since points may obscure each other by occupying similar positions along the axis, a more instructive representation may be given in the form of a histogram. The secondary axis then represents a count of the samples. This graphical representation then shows how many data samples lie at any particular distance orthogonal to the separating hypersurface. (See, e.g., FIG. 11.)

For a two dimensional representation that accurately represents the separation, the vector normal to the svm decision surface can form one axis. The second dimension may be constructed from any other vector derived from any other supervised or unsupervised method. Among these possibilities for the remaining axes, is the use of first and second principal components, or first and second independent principal components, as well as other quantities that may occur to those skilled in the art. In a particularly preferred embodiment of the present invention, this second axis is kept orthogonal to the svm solution direction so that the distortion caused by mixing non-orthogonal vectors is avoided. The data is then proportionately represented in a two-dimensional subspace projected from the complete higher-dimensional feature space. In the case of nonlinear mappings of the data, the same kernel function may be used for all methods employed, to ensure that all machine learning methods find their solution in the same feature space.

In an additional embodiment of the invention, a second or additional axis is produced that comprises the non-redundant direction relative to the first axis formed by the learning machine solution. To create a non-redundant axis relative to the first axis, the second axis is made orthogonal to the first axis, starting in the full original feature space.

For pseudo-3D representation of the svm solution, three axes are needed. This is an extension of the above methods for obtaining an accurate two-dimensional representation. One of the axes can be the directional vector of the svm (vector normal (orthogonal) to the svm separating hypersurface). Several possibilities exist for the remaining two axes, among them the use of first and second principal components, first and second independent principal components, as well as other quantities that may occur to those skilled in the art. In a particularly preferred embodiment, all of these axes are kept orthogonal to each other by using methods that exclude the redundant information relative to the vector orthogonal to the svm separating hypersurface, and orthogonal to each other (e.g. FIG. 7). As above, these methods can be applied to data in which the high dimensionality is due to the data itself, or to a mapping by kernel or other methods into high dimensional space.

Axes for Data with More than Two Categories

In the most typical case, the separation being represented is between two classes. However, the method is easily extended for representation of an svm solution that applies to more than two classes of data. One method for doing this is through the use of more than one svm. For example, to obtain classification of 4 classes of data, three svms can be created when using one-versus-all-other trainings. Alternatively, one may also obtain classification for three classes with three svms, using one svm for each possible pair. Then each axis of a pseudo-3D display can be the directional vector for a different svm, showing how all three work together to uniquely classify four types of data (e.g. FIG. 8). In a particularly preferred embodiment, the solution vectors of all three svms are altered to make them orthogonal to each other.

It is possible to train svms or any other binary classifier to solve multiple class problems by creating a series of these 'one class vs. all other' binary decision classifiers, or by creating a series of binary classifiers for each possible pairing of classes. The current methods for representative display may be extended to these types of solutions also. The original solution vectors associated with the trained hypersurfaces may be altered to be made into an orthonormalized basis.

Orthonormalization of Axes

A preferred algorithm for performing this orthonormalization of axes is kernel PCA. The use of other methods for orthonormalization is possible and included in the scope of the invention. The full orthonormal set may be used for subsequent data analysis via machine learning, or the first 3 dimensions used for visualization.

Methods which make the axes orthogonal, but not of unit length are also included within the scope of this invention.

Additional Components for Subspace Creation

In a further embodiment of the invention, a hypothetical pattern may be used instead of or in addition to a machine learning solution. This hypothetical data pattern may be derived from user domain expertise, or other means. The hypothetical pattern may then be used directly to form an axis, may be orthonormalized with respect to other axes, and/or may be subjected to other methods of processing prior to incorporation into the representation of the data in lower dimensional space.

Inclusion of Methods Other than svm

Other machine learning methods may be used in an analogous fashion, and their solutions used as axes to allow the separation of data categories achieved in high dimensional space to be accurately represented in one, two or three dimensions.

The current invention may take an ensemble of any number of hypersurfaces in feature space, derived from user domain expertise, hypotheses or machine learning techniques, and project data onto a lower dimensional subspace for the purpose of further data discovery and/or display. The subspace may be defined or represented using a true orthonormal basis.

The present invention thus allows for any combination of supervised, unsupervised, actual patterns or hypothetical patterns to be incorporated into a single data model for visualization or for further data discovery and analysis.

Discovery Through Display

One purpose of the invention is to highlight the structure of the data in low dimensions (1-3 dimensions for visualization, and 1 . . . N dimensions for more general data discovery methods). Investigating the structure of the data in low dimensions can lead to discovery about the data and/or to greater understanding of the data. In the case of machine learning methods, the hypersurfaces that separate the data categories may be obtained via supervised or unsupervised means. Any machine learning technique which produces one or more hypersurfaces that separate data into categories may be employed. This includes common supervised methods such as the SVM and neural networks that are used when known data categories are given in the data, as well as unsupervised methods such as PCA, ICA, and Gram-Schmidt or other reduction that may be employed to discover natural data groupings of innate categories in the data. The combination of the data structures revealed or discovered by both methods into a single display can lead to greater understanding as well as novel discovery about the data. The combination of the data structures found by both types of methods into a single low dimensional subspace for further data analysis may lead to unexpected new discoveries about the data.

The inclusion of a hypothetical pattern as a possible part of the data representation is a highly novel aspect of this invention. It allows a user/researcher to incorporate information derived from experience, domain knowledge, informed insight, or an intuitive hunch into a data model. The model may then be compared by display to actual data in an effort to confirm or refute the hypothesis. A comparison of the model to actual data may also result in a refinement or modification of the initial hypothetical pattern.

Similarly, the inclusion of an actual selected data pattern into the display may lead to discovery about other data samples or data features that are now emphasized by the groupings seen in the display.

Extension to Additional Mathematical Algorithms

The invention may utilize, but is not limited to, any algorithm which discovers the lower dimensions using the primal or dual representation of the data. The primal representation is the original feature representation of the data. The dual form expresses the solution in terms of a weighted combination of the samples.

A general hypersurface, derived by any means, will be linear or nonlinear in the original feature space. For machine learning methods which may be optimized in dual form, using the kernel trick, this general nonlinear hypersurface is never explicitly manipulated. Instead, the algorithm works in the kernel mapped feature space where the hypersurface is a simple hyperplane. In the case of methods which cannot be optimized in dual form, such as a NN, or a hyperplane directly chosen by the user, an approximation of the hypersurface in dual form may be discovered by artificially augmenting the data set to include points which lie on either side of the hypersurface, and training an additional kernel machine learning method using this artificial data set.

Using the Approach Repeatedly on the Same Data Set

An embodiment of the invention may optionally include an iterative approach. One or more hypersurfaces are processed, producing one or more basis vectors. The data is then projected onto the subspace orthogonal to these basis vectors and reprocessed.

In Addition to Display, Further Discovery Using the Subspace

Further data discovery, as mentioned in the definition of this invention, may also include any machine learning method on the reduced subspace.

A machine learned subspace is more than a simple reduction to lower dimension; it is a mapping to a feature space where the structure of the data is highlighted. Different elements of the structure may be emphasized by the different components of the subspace. Once the data is mapped (projected) to the subspace, subsequent data discovery using additional machine learning or any analysis method can be performed. Analysis taking place on the data in lower dimensions is computationally less burdened than analysis that is done on the original, larger scale data. For example, by combining SVM and PCA analysis, both supervised and unsupervised structure is revealed in the subspace defined by the SVM and PCA; subsequent data discovery with other machine learning methods or analysis methods can be applied to the new mapping (projection) of the data, and will take less time on this smaller dataspace.

An overview of the flow of this process is given in FIG. 1. The following is one embodiment of the method. First, determine one or more hypersurfaces in a given feature space. Next, create an orthonormal basis for subspace using hypersurface(s) and then project data onto subspace (i.e. express the data in the updated feature space). Optionally, another hypersurface can then be found and this process can iterate. When the desired number of iterations have occurred, the data can be further analyzed through human or machine means of pattern recognition (i.e. through visualization, or with additional structure-revealing computational tools).

After Creation of Subspace, More Ways to Use it

A further aspect of the invention is the use of the subspace created by these methods to display/represent data examples as points or vectors within the subspace. For example, when using an svm, the training data examples may be represented as points or vectors within the subspace defined by the three axes. The categories given in the training data may thus be visualized as clusters of points within the subspace.

Various methods can also be employed to use these clusters of points as the basis for defining a region of subspace corresponding to each category of data and visualizing of this region as a surface or pseudo-three dimensional solid object in the display. Methods for approximating this region by mathematical means and the use of this region in further analysis are also encompassed by this invention.

Using the Subspaces/Displays Once the Axes are Defined to Compare to Other Data

Additional data, not used in defining the subspace or axes may also be displayed as points, vectors, surfaces or solid objects on these axes, including but not limited to such as data presented for classification, or entire databases that have been searched or queried. Methods for approximating these non-training regions by mathematical means and the use of these regions in further analysis are also encompassed by this invention.

Displays may be created that show both data used in training, if any, and other examples of data not used to create the subspace. This may be useful, for example, to illustrate how closely the data not used in the training and creation of the subspace fit into the original training categories.

This type of display may also be used when a search has been conducted for data patterns similar to the training data, hypothetical patterns, or actual patterns used to create the subspace to illustrate how the resulting patterns compare to the original training data, hypothetical or actual patterns used to create the subspace. Data not used in defining the subspace may be represented as points, or vectors within the subspace, and the display may optionally include the original training data as points, vectors, surfaces or solids. Preparing these additional data for display may include normalization, modification or other mathematical methods. Contrasting colors or patterns may be used to emphasize differences or similarities among the data items being displayed.

Displays may also be created that visualize entire data repositories, databases or other large data sample collections. The data from these large data collections may be normalized, modified, or otherwise preprocessed prior to display. These displays may or may not include any of the data used to define the subspace. Entire databases or data repositories may be subjected to representative sampling and the samples used in the display. Density estimation may also be performed and the resultant density estimates used in the subspace display.

Novel aspects of these displays (models) are that they are based on actual data values, not on associated annotations or keywords, and can thus find associations that are not based on preconceptions.

Data Surveillance and Detecting Deviations from Normal

The methods of this invention for creating orthogonal subspaces of reduced dimension may also be used to detect abnormal changes during ongoing data collection. An existing collection of normal data is used to generate a model of the data as a lower dimensional subspace. New data samples can be compared to this normal, lower dimensional model, and any data samples that do not fit within the normal space, or model, can be indicated. Moreover, the data features that are responsible for the deviation of any particular new data sample can be determined and presented. Possible uses for this invention include examination of samples related to human, animal, plant, or environmental health, surveillance for many types of data, detecting improper or changed preprocessing of data samples and detection of equipment malfunction or failure during data collection.

One preferred algorithm for performing this orthogonalization is incomplete Cholesky decomposition, where directions with the highest residual are chosen in order to emphasize the structure of the data. Other methods for orthogonalization or orthonormalization including PCA, can be used similarly to create a subspace of reduced dimension and detect new samples that do not fit within the defined space. Such methods are included within the scope of this invention.

Computer Implementations of the Subspace

Many methods of converting the mathematical definition of the subspaces and data examples of the current invention into software and computer graphics are available. Particularly desirable for the current invention are those methods that are interactive, allowing a viewer to rotate, spin and manipulate the display so as to view the display from different perspectives. This can be variously accomplished by for example, the use of java applets, the use of mathematical software packages such as Mathematica, or Matlab, or can be encoded into any of numerous computer languages.

The current invention also encompasses implementation of these concepts as software or computer algorithms. It includes the use of hardware for processing and storage of these algorithms and associated data. An example of such an implementation is given in FIG. 19.

Software for Knowledge Extraction Using Displays and Subspaces Created by the Methods of this Invention This invention will create an environment in which users interact with large-scale data sources intuitively and naturally, but which is supported by sophisticated mathematical methods. The use of these novel methods for 3D visual displays as a foundation for exploration and discovery from data by individuals who do not necessarily need to understand the complexities of the mathematical methods. The computer software and infrastructure to enable these are encompassed by the current invention.

Computer software can be constructed using intuitive interactive graphical methods for database exploration that utilize the data subspaces derived by the methods of this invention. This encompasses tools for database exploration, such as projection of entire databases into smaller subspaces and locating all data points within this subspace to view the 'shape' of all of the data and the relationships among points.

For example, software can enable a researcher to pre-test hypotheses by visually comparing existing data to a subspace created with incorporation of a hypotheses.

The results of methods for querying or searching a database, such as those included in U.S. patent application Ser. No. 12/557,344, filed on Sep. 10, 2009, the contents of which are incorporated herein by reference, could be illustrated with a pseudo3D display created with the methods of the current invention. The use of a pseudo3D display as the result of a database search or query conveys more information about the relatedness of the samples or features within the database than can be obtained from a simple sequential list.

Highly intuitive interactive graphics software can not only implement the displays and subspaces created with the methods of this invention, but can also use these displays as the interfaces to software tools and to data repositories. The pseudo-3D graphical displays can be utilized for viewing, selection and manipulation of data.

Graphical displays created using the methods of this invention can comprise a novel graphical database accessing method. The graphical display permits a more complex relationship among data records to be represented than is permitted by a simple ordered list. One or more data records may also be chosen by direct selection of the representation of the record in the display and the corresponding data record can be retrieved. The invented graphical methods that reflect mathematical projections of the data into lower dimensional space can represent far more complex relationships among the records in a database.

Software may also be created that includes the ability to issue an automated alert, such as but not limited to an email or dashboard notification when a data sample that fits within certain criteria when compared subspace defined by the methods of this invention is added to a database or data repository. Regularly scheduled or repeated searches of a database to compare its data samples to a subspace defined by the methods of this invention can also be implemented.

Components of software that may comprise portions of this invention include, but are not limited to the following: (1) A scientific web interface based loosely on the business management dashboard that can be customized to the scientific/health interests of a researcher and uses displays and analysis methods defined by this invention; (2) Software that uses spatial displays, including interactive displays to allow analysis, data exploration and model building that is based upon the methods of this invention; (3) A hypothesis workstation that can accept hypothetical data patterns, search for the closest actual data matches, and display them using the methods of this invention allowing refinement of hypotheses in silica; (4) Software that issue alerts for new information that matches certain criteria with respect to the subspaces created by the methods of this invention from multiple sources including local or remote data repositories and data from local or remote devices that can be monitored; (5) Software that can represent graphical results of a database query or search using the invented methods for projection of high dimensional data into lower dimensional space to create displays; (6) Software to display or model the shapes of dataspaces, including those as multiple spheres or other shapes or as surfaces and including interactive capability within those displays; (7) Software that can display entire databases, either including every database sample, or a representative sampling of the databases using axes or subspaces defined by the methods of this invention; (8) Software that creates a visual display and includes database access methods for data chosen by selecting 'regions' of interest from the display; (9) Software that creates a visual display of a normal data model and optionally can represent how new data fits or does not fit within the model; and (10) Servers that host the computational software using methods defined by this invention.

The invention also encompasses use of the invented methods with cloud computing. One cloud computing server can specialize in data and software for particular needs but serve users web-wide. Cloud computing also introduces the concept of a different way of interacting with these remote sources that is not dependent on using web pages, but on transparently connecting as if the resources were local. See FIG. 19.

Implementation

Figure 20:
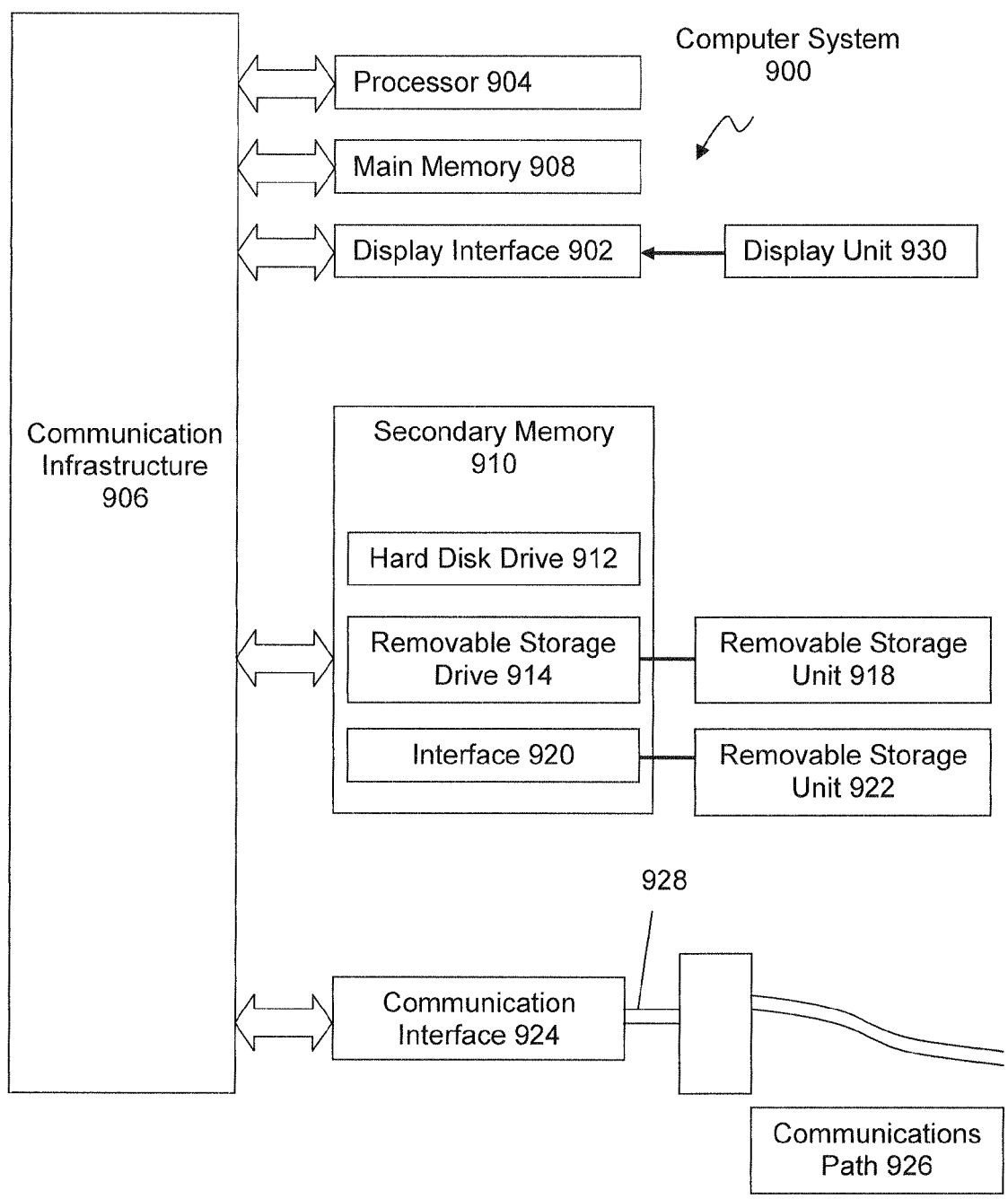
FIG. 20 presents an exemplary system diagram of various hardware components and other features, for use in accordance with aspects of the present invention.

Aspects of the present invention may be implemented using hardware, software, or a combination thereof, and may be implemented in one or more computer systems or other processing systems. In one variation, aspects of the invention are directed toward one or more computer systems capable of carrying out the functionality described herein. An example of such a computer system 300 is shown in FIG. 20.

Computer system 300 includes one or more processors, such as processor 304. The processor 304 is connected to a communication infrastructure 306 (e.g., a communications bus, cross-over bar, or network). Various software aspects are described in terms of this exemplary computer system. After reading this description, it will become apparent to a person skilled in the relevant art(s) how to implement aspects of the invention using other computer systems and/or architectures.

Computer system 300 can include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well-known manner. Removable storage unit 318, represents a floppy disk, magnetic tape, optical disk, etc., which is read by and written to removable storage drive 314. As will be appreciated, the removable storage unit 318 includes a computer usable storage medium having stored therein computer software and/or data.

In alternative aspects, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 314, a hard disk installed in hard disk drive 312, and signals 328. These computer program products provide software to the computer system 300. Aspects of the invention are directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 310 to perform the features of the present invention. Accordingly, such computer programs represent controllers of the computer system 300.

In an aspect where variations of the invention are implemented using software, the software may be stored in a computer program product and loaded into computer system 300 using removable storage drive 314, hard drive 312, or communications interface 320. The control logic (software), when executed by the processor 304, causes the processor 304 to perform the functions of the invention as described herein. In another aspect, some variations of the invention may be implemented primarily in hardware using, for example, hardware components, such as application specific integrated circuits (Asics). Implementation of the hardware state machine so as to perform the functions described herein will be apparent to persons skilled in the relevant art(s).

In yet another aspect, variations of the invention may be implemented using a combination of both hardware and software.

Figure 21:
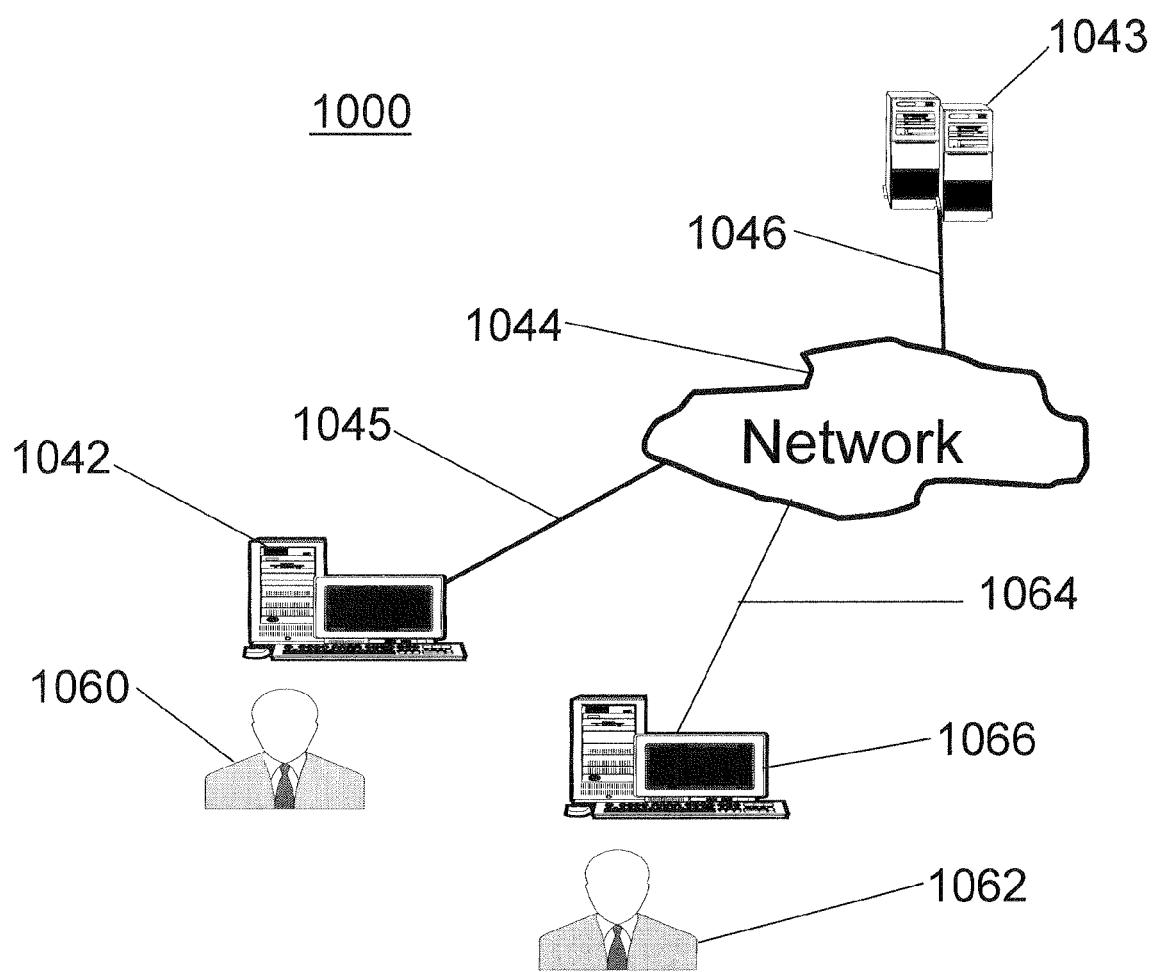
FIG. 21 is a block diagram of various exemplary system components for use in accordance with aspects of the present invention.

FIG. 21 shows a communication system 400 usable in accordance with aspects of the present invention. The communication system 400 includes one or more accessors 460, 462 (also referred to interchangeably herein as one or more "users") and one or more terminals 442, 466. In one aspect, data for use in accordance with some variations of the present invention is, for example, input and/or accessed by accessors 460, 464 via terminals 442, 466, such as personal computers (PCs), minicomputers, mainframe computers, microcomputers, telephonic devices, or wireless devices, such as personal digital assistants ("PDAs") or a hand-held wireless devices coupled to a server 443, such as a PC, minicomputer, mainframe computer, microcomputer, or other device having a processor and a repository for data and/or connection to a repository for data, via, for example, a network 444, such as the Internet or an intranet, and couplings 445, 446, 464. The couplings 445, 446, 464 include, for example, wired, wireless, or fiber optic links. In another aspect, the method and system in accordance with aspects of the present invention operate in a stand-alone environment, such as on a single terminal.

EXAMPLES

Exemplary implementations in accordance with aspects of the invention will now be further described with respect to the following non-limiting examples.

Example 1

AML/ALL Data Model that Visualizes the Svm Solution and Combines Supervised and Unsupervised Methods into a Single Visual Data Model Training data was obtained from a gene expression dataset for AML vs ALL leukemia types publicly available from the Broad Institute. This data was originally published by Golub et al, *Science* 286:531-537. (1999). The data contained 38 examples, 11 AML samples and 27 ALL samples, all from bone marrow of patients with the respective diseases. Training was conducted using an svm. Upon completion of training, the vector normal to the solution hyperplane was used as the x-axis. Principal components analysis was then used on the original full-featured data set. The first principal component was then ortho-normalized to the x-axis and the resulting vector used as the y-axis. The second principal component was then ortho-normalized to the first two axes and used as the z-axis.

Each example used in the training data was then represented as a point in space. The location of the point is determined by the values for that data point of each of the features used in creating each axis, uniquely locating this data example within the subspace determined by the three axes. Each example of AML is shown as a blue dot, and each example of ALL is shown as a red dot.

Figure 7:
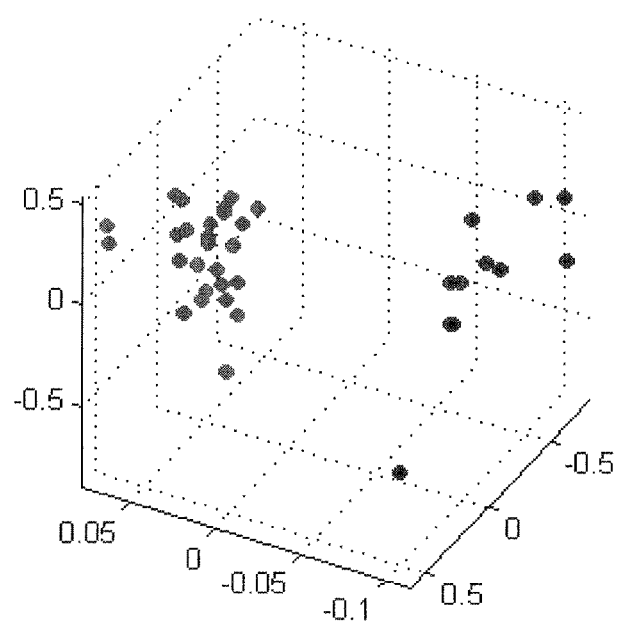
FIG. 7 shows the display in pseudo-3D of the solution obtained by training an svm on a data set for AML vs. ALL (types of leukemia). The x-axis is the solution hyperplane of an svm, the y-axis is the first principal component of the original data, ortho-normalized to the x-axis, and the z-axis is the second principal component ortho-normalized to the first two axes. A clear separation of the two data categories is evident from their visualization as two distinct clusters shown in contrasting colors.

A display was created using a java applet that allows the viewer to manipulate the display by turning, rotating, and altering the point of view. One of these possible viewpoints is shown in FIG. 7.

This example illustrates the use of the visualization method that incorporates a machine learning solution as an axis in a pseudo-3D display and that also incorporates unsupervised methods through the use of the first two principal components.

The data model thus presented merges both supervised and unsupervised information into a single data model, and defines a unique subspace that incorporates both supervised and unsupervised information in a novel method of presenting data analysis that incorporates both approaches.

The visualization clearly represents the separation of the classes graphically, a substantial improvement over currently available methods for illustrating the solution of a learning machine.

Example 2

A Multiclass Alzheimer's Data Set with Visualization of Multiple Machine Learning Solutions and a Purely Supervised Model To illustrate the use of the display method with multiple trained machines without resorting to the incorporation of any unsupervised methods to obtain visualization axes, a multi-class data set was used. Training data was obtained from the public data repository, GEO. A gene expression data set derived from postmortem brain tissue for Alzheimer's patients and patients with normal brains was used. The set consisted of 31 samples of post-mortem brain tissue in 4 classes: 9 healthy, 7 with incipient disease, 8 moderately diseased and 7 severely diseases samples. This gene expression data had been collected using Affymetrix chips containing probes for 22,215 genes as described in the journal article by Blalock et al (2004) PNAS 101 2173-2178. Each sample therefore contained levels for more than 22,000 genes.

To solve this classification problem, three classes of disease and one normal tissue class were used, giving a total of four categories. A machine learning solution was obtained by training three svms, in combination with reduction in the number of features used by each svm.

Figure 8:
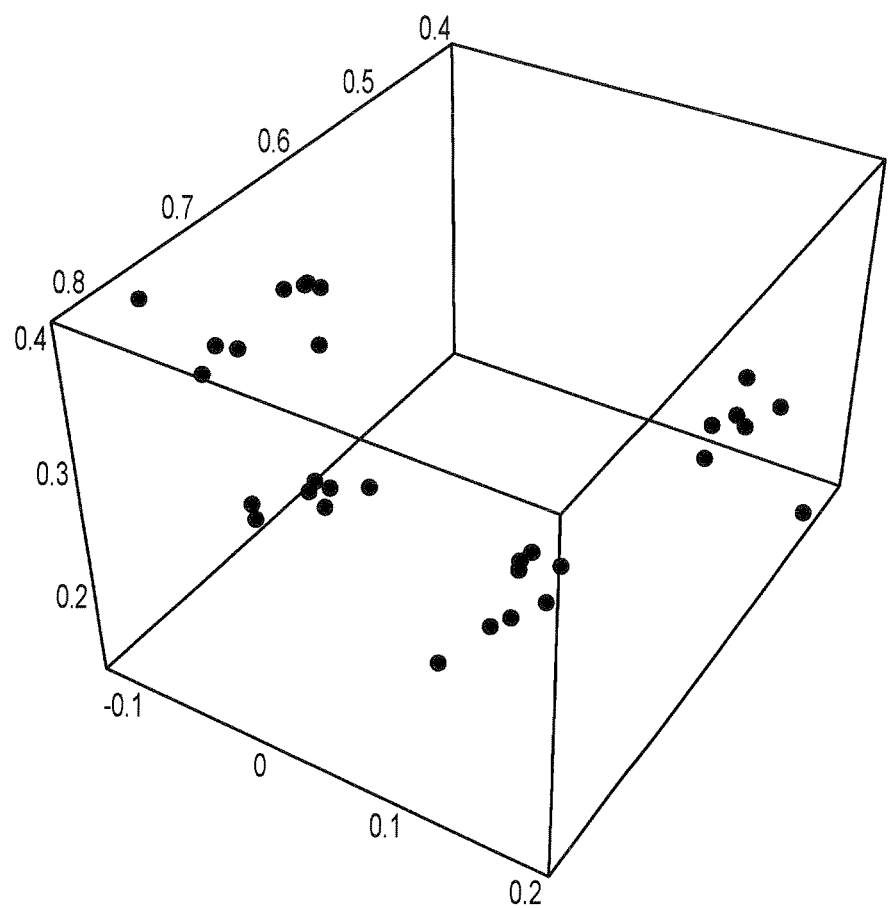
FIG. 8 shows the separation among multiple data classes where each axis is the orthogonal vector derived from one of the three separating hyperplanes of the three svms used to obtain the mathematical solution.

The vector normal to the solution hyperplane for each svm is used as an axis, orthonormalized to each other svm solution. An interactive pseudo-3D display was then generated using a java applet. One view of this data is shown in FIG. 8.

Each of the data examples used in training for the four categories was represented in a discrete color. The four categories clearly clustered into discrete regions of the low dimensional subspace shown.

This example uses machine learning solution directions exclusively in the pseudo-3D display, without the incorporation of any unsupervised directions.

This display is a highly effective method for visualizing the multi-class solution graphically. All samples for each category are visualized as clearly well separated from every other category, and demonstrate a novel approach for presenting machine learning results.

Example 3

Comparison of Visualization Obtained with the Current Invention to the Visualization of Unsupervised Methods Alone on a Sarcopenia Data Set A publicly available data set was obtained from the GEO database.

Using methods available in the current state of the art, the data was analyzed using principle components analysis, and the first three principle components used to create axes. A java applet was created to visualize the results. The results presented graphically in FIG. 9. Each data example is shown as a single sphere, colored according to which of the two classes it belongs.

Next, using an svm, a separating hyperplane was found between the classes and the vector normal to it was selected as the x-axis. Principal component analysis was then used to create the second and third axes from the first and second principal components respectively. A java applet was created to visualize the results. The results are presented in FIG. 10, where each data example is shown as a single sphere colored according to which of the two classes it belongs.

It can be seen that the solution of the svm solution is now graphically represented with clear separation between the classes, and with the addition of the principal components giving additional information about the relatedness of the data. This presentation exemplifies the novel visualization of an svm solution.

Figure 9:
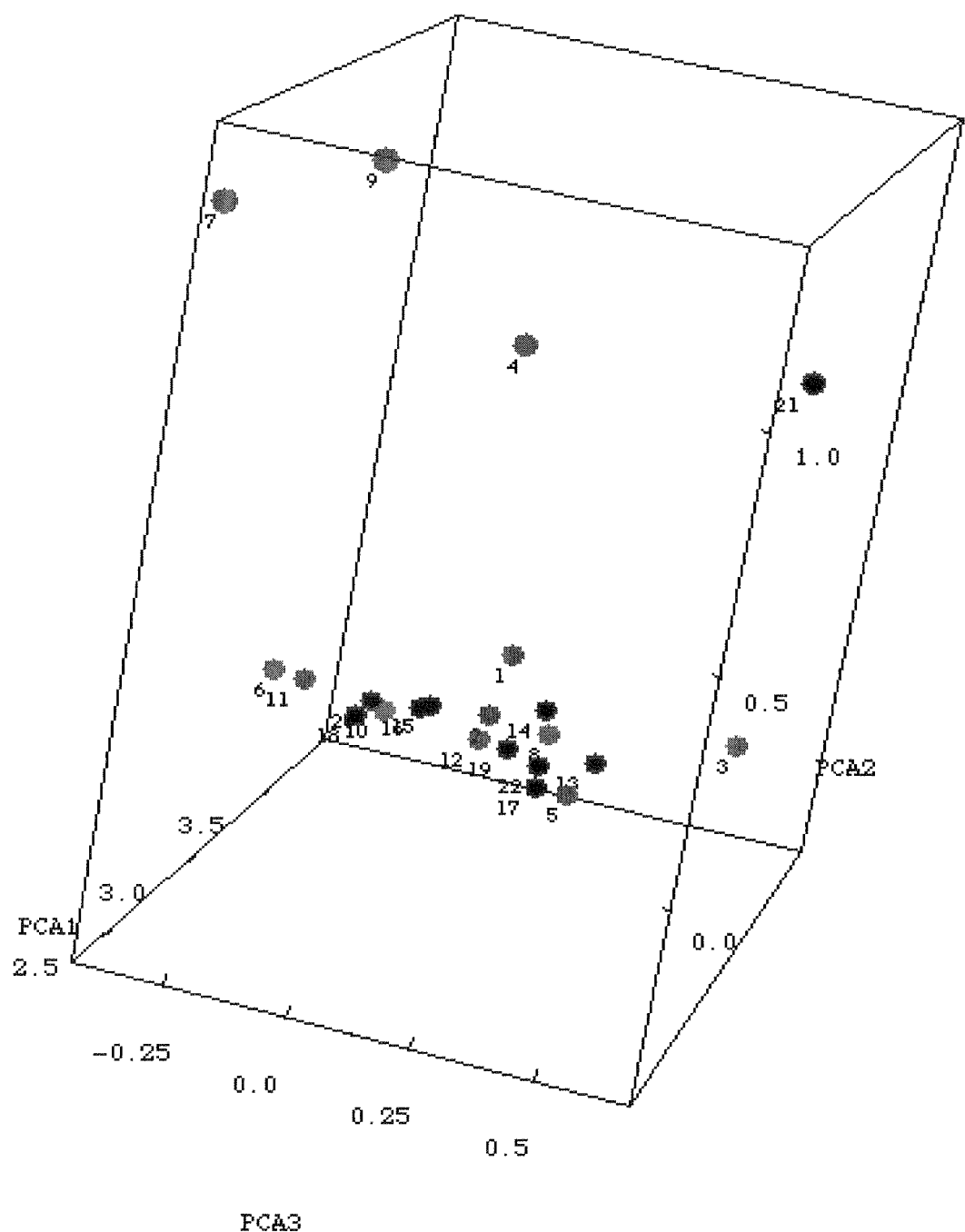
FIG. 9 shows a data space visualized by unsupervised means only, as exists in the current state of the art. The diagram shows a pseudo 3D display of data samples of two classes represented by blue and red. The three axes are created by the use of principal components analysis. In this case, the visible separation of the data classes is poor, with samples of both classes appearing in over-lapping regions of the data space as revealed by principal components analysis. Four points appear as outliers, revealing some information about the data structure.
Figure 10:
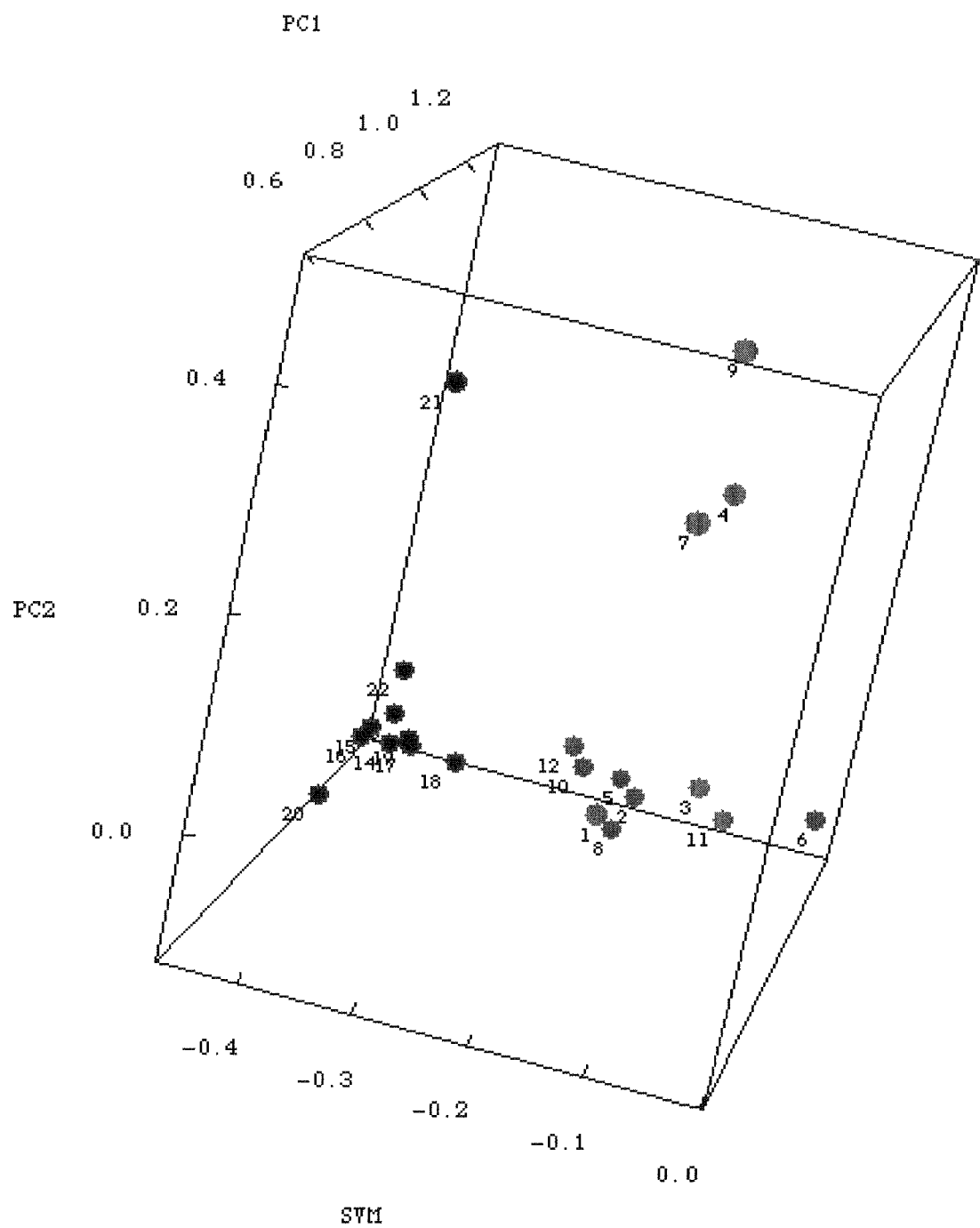
FIG. 10 is a pseudo-3D representation of the same data samples as shown in FIG. 9, but using the methods of the invention to improve the visible separation of the data. The svm solution forms one axis. The distinction and lack of overlap between classes is made visually evident, while the outliers are still obvious.

The incorporation of both information obtained about the data by supervised means, in this example svm, and unsupervised means, in this example PCA, into a single data model is a novel approach to data modeling, and shows a dramatic improvement in the visualization of the separation of data into classes than obtained by unsupervised means alone as is common in current data visualizations (FIG. 10 graphically shows improved separation compared to FIG. 9).

Example 4

Visualization of a Single Machine Learning Solution and Visual Presentation of New Data Compared to the Model A data set was chosen that used gene expression examples and had two categories, diseased and healthy tissue. An svm was trained. New data samples were presented to the svm for classification. To classify, the new data is presented to the learning machine and the learning machine determines to which of the learned categories the data belongs. A value was determined that reflects the distance of each sample from the separating hypersurface. The results of the classification are shown graphically using the methods of this invention in FIG. 11.

The x-axis was the vector normal to the separating hyperplane of the trained machine. The zero point was the location of the separating hyperplane, and the scale of the axis represented distance along the vector normal to the separating hyperplane. The y-axis was a simple count of samples. The histogram summarized how many of each sample presented for classification fit within a binned distance from the separating hyperplane.

This gave a graphic display of the distance of the new sample from the decision boundary, and visually presented information about the certainty of the classification based on its distance from the zero point.

This example demonstrated the graphic display of a single axis based on a learning machine solution using the training data, with a second axis based on quantity, and also of the ability to visually represent the comparison of new data to the data model.

Example 5

Comparison of New Data to the Graphic Data Model in Three Dimensions

A data set was obtained from the public GEO repository. The data was used to train an svm. New data was obtained from a second data set, and presented to the svm for classification.

Figure 12:
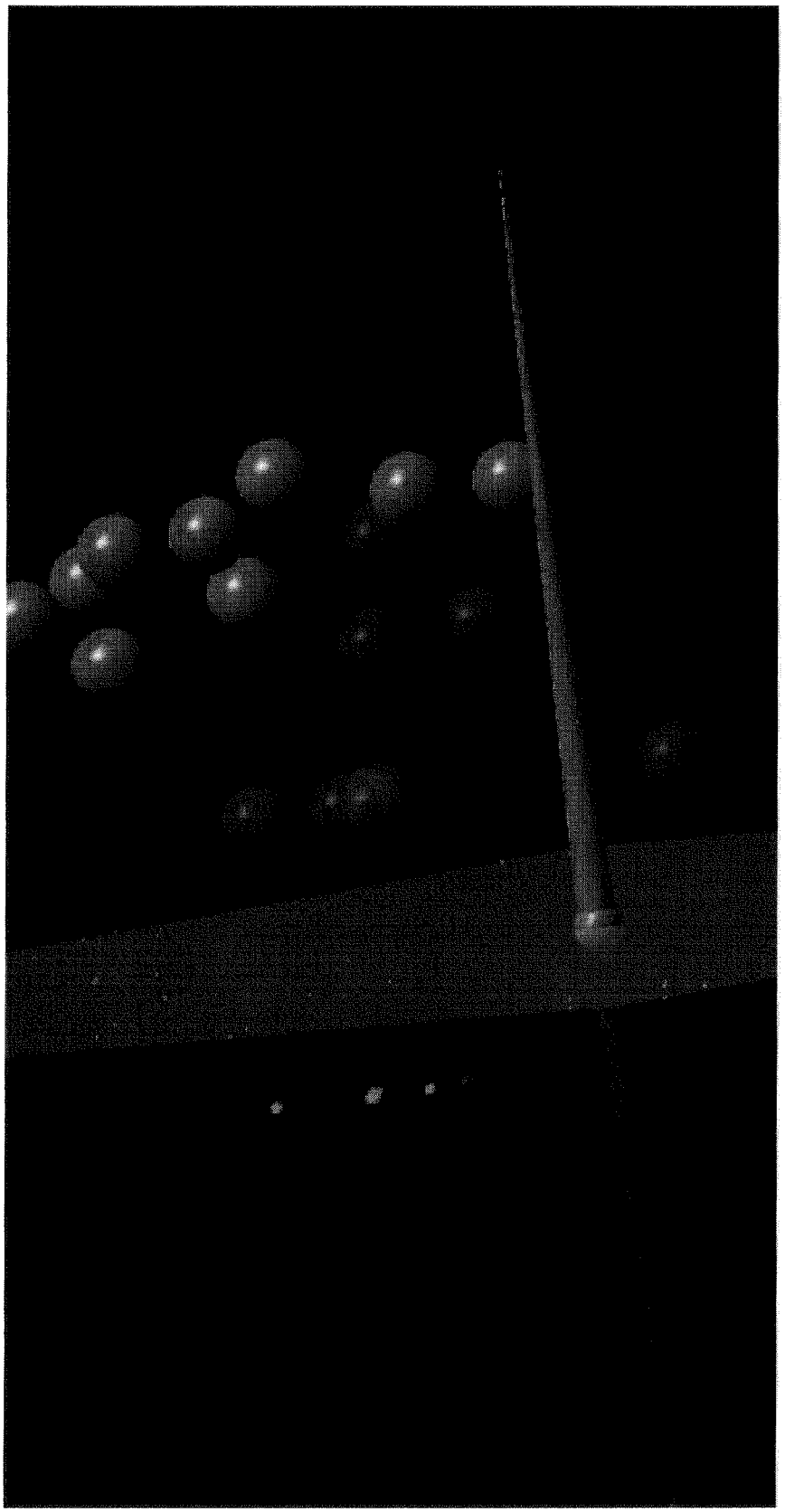
FIG. 12 is a display showing the graphic display resulting from a model, and the new data presented for comparison to it. The displayed blue-red axis is created from the vector normal to the separating hyperplane of the svm. The other two dimensions are created from PCA. The darker blue and red spheres are the training examples. The bright red spheres are the samples newly presented for classification.

A graphic display was created using the vector normal to the separating hyperplane of the svm solution as the first axis. The first two principal components were then used to create the second and third axes. The original data used to train the svm are presented in dark blue or dark red. The new data presented for classification was shown according to its predicted class as bright red or bright blue, in this case all of the new samples were classified as red. The display is shown in FIG. 12.

Example 6

Figure 13:
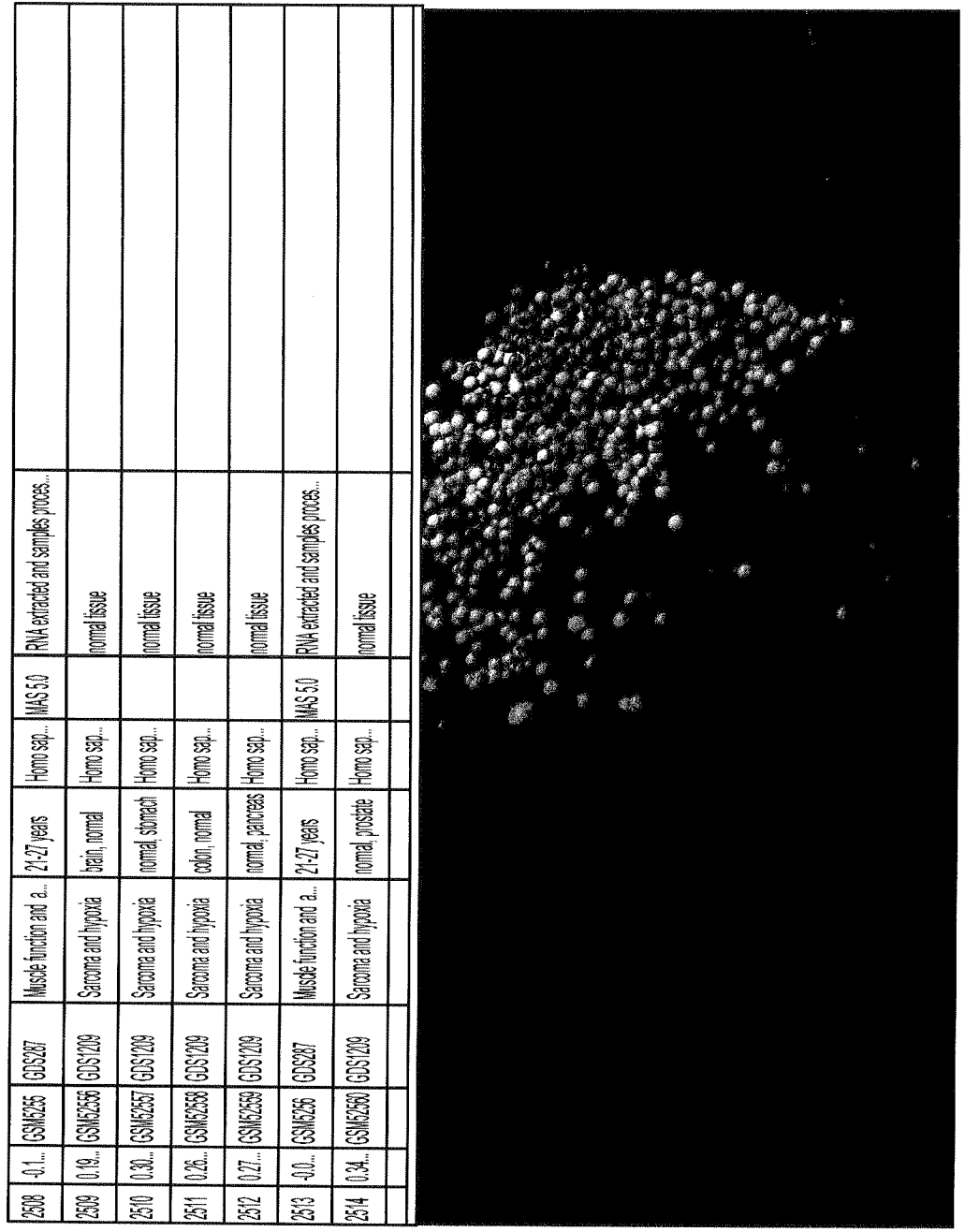
FIG. 13 is a display showing an entire database represented in a 3D graphical model. The blue-red axis was created from a learning machine, and the distribution across the two additional dimensions was done with principal components analysis. The separating hyperplane of the learning machine is represented by the gray plane. Each record in the database is shown as a sphere in the subspace created by the model. The enlarged pink sphere has been selected, and the database record for it retrieved. The additional data from the database record is displayed at the top of the list above the graphic model. The graphical model forms an index that allows the view and retrieval of database information with respect to its relationship to the constructed subspace.

Representation of an Entire Database in the Graphic Data Model and Use of the Graphic as a Database Accessing Method A publicly available data set was chosen from the GEO data repository. An svm was trained using the positive and negative examples provided. A test database was created that consisted of a subset of the data records available from GEO. A query against the database was run where each record was compared by the svm to its learned categories. The result of the search is displayed graphically in FIG. 13. This figure shows one sphere for each record found in the database. The space for the pseudo-3D graphic was created using the svm solution as one axis and the first two principal components as additional axes.

The pale sphere that was enlarged at the upper left of the graphic was selected and used to retrieve the record from the database. The line across the top of the figure displayed the additional information that has been retrieved from the database.

The entire database was viewed and the distribution in space studied with respect to the values of the genes contained in each record, and how those values are interpreted by the trained svm and the perspective of principal components analysis.

Thus the entire database was graphically represented in a model that combines supervised and unsupervised approaches into a single visual model. The graphical model itself was viewed and used as a database 'index' and used as a database accessing method.

Example 7

Figure 14:
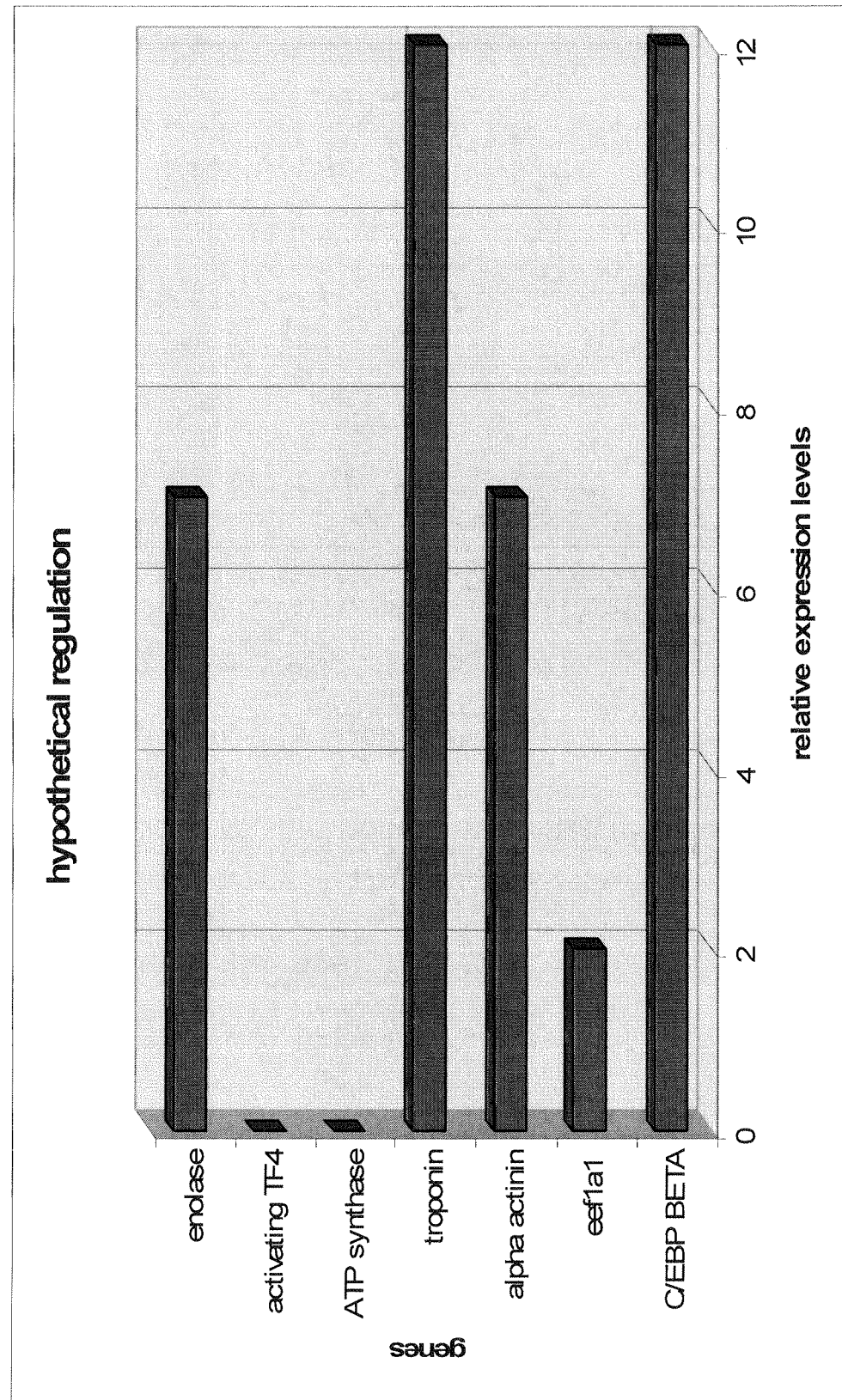
FIG. 14 is a bar chart that gives an example of a hypothetical pattern wherein subsets of data features are assigned values. The invention then will reduce all the data examples to be screened to the same features, and compare their values to the hypothetical pattern giving a ranking or score of how closely they match the hypothetical pattern.

A Hypothesis about Gene Expression and its Incorporation into a Database Model and Accessing Method An example of a hypothesis about gene expression is shown in FIG. 14. A selection of molecules was made, and assigned a gene expression value. This gives a representation of the hypothesis in the form of a gene expression or feature pattern.

Figure 15:
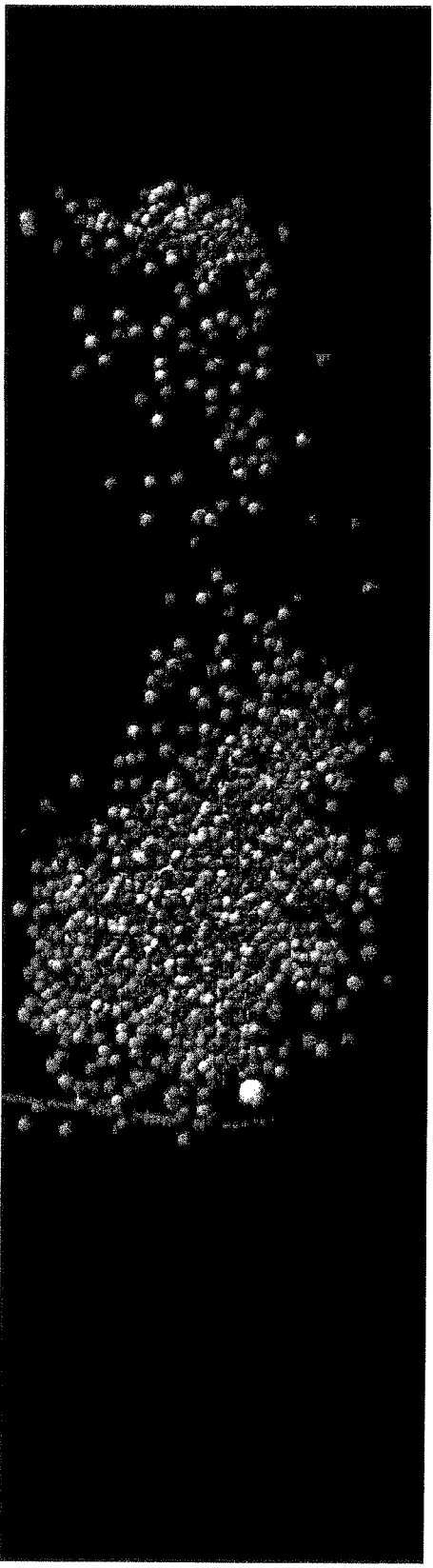
FIG. 15 is a display illustrating the use of a hypothesis in creating a data model. In this instance a hypothetical data pattern was created for four genes, shown in the feature list at lower right. This hypothetical pattern was used to query a database. The space was created by generating three axes using principal component analysis on the genes used for the hypothetical pattern. Each record in the database is represented as a sphere. It can be seen that the records form two discrete clusters. Using the display to retrieve database records from the smaller cluster at right reveals them to all be muscle samples. The point of origin is the hypothetical data pattern. The currently selected sphere is the enlarged one near the origin and the actual values for its expression are shown in the column labeled sample at lower right, and across the top of the display is additional information from the database record. All of the nearby (most similar to) actual samples to the hypothetical pattern were found to be from cancerous tissue.

A different example of a hypothesis was created using 4 genes and used to search a database for potentially matching or similar patterns. The results of the database search were represented graphically and are shown in FIG. 15. The point of origin in the graphic display is the hypothetical data pattern. Axes were generated by principal component analysis using the selected genes. Each record in the database is shown within the created subspace as a sphere. Those with patterns most similar to the hypothetical pattern are closest to the origin.

The display was used as a visual index to the database. In the figure, a pale sphere on the left has been selected and is enlarged. It was used to retrieve and display the database record information given at the top of the display in the highlighted line.

It was seen that this subspace revealed two clusters in the distribution of data records. The smaller cluster located to the right in FIG. 15 was shown by selection and retrieval of database examples to contain muscle tissue samples. The samples clustered near the origin were retrieved from the database and found to be largely cancerous tissue samples showing that the hypothesized data pattern occurs in abnormal tissue samples. Thus the visual model of the subspace led directly to discovery of information about the hypothesized gene pattern and where similar patterns occur. It also led to the discovery that many muscle tissue samples can be distinguished from the remainder of the database records by their expression values within the modeled subspace.

Example 8

Figure 16:
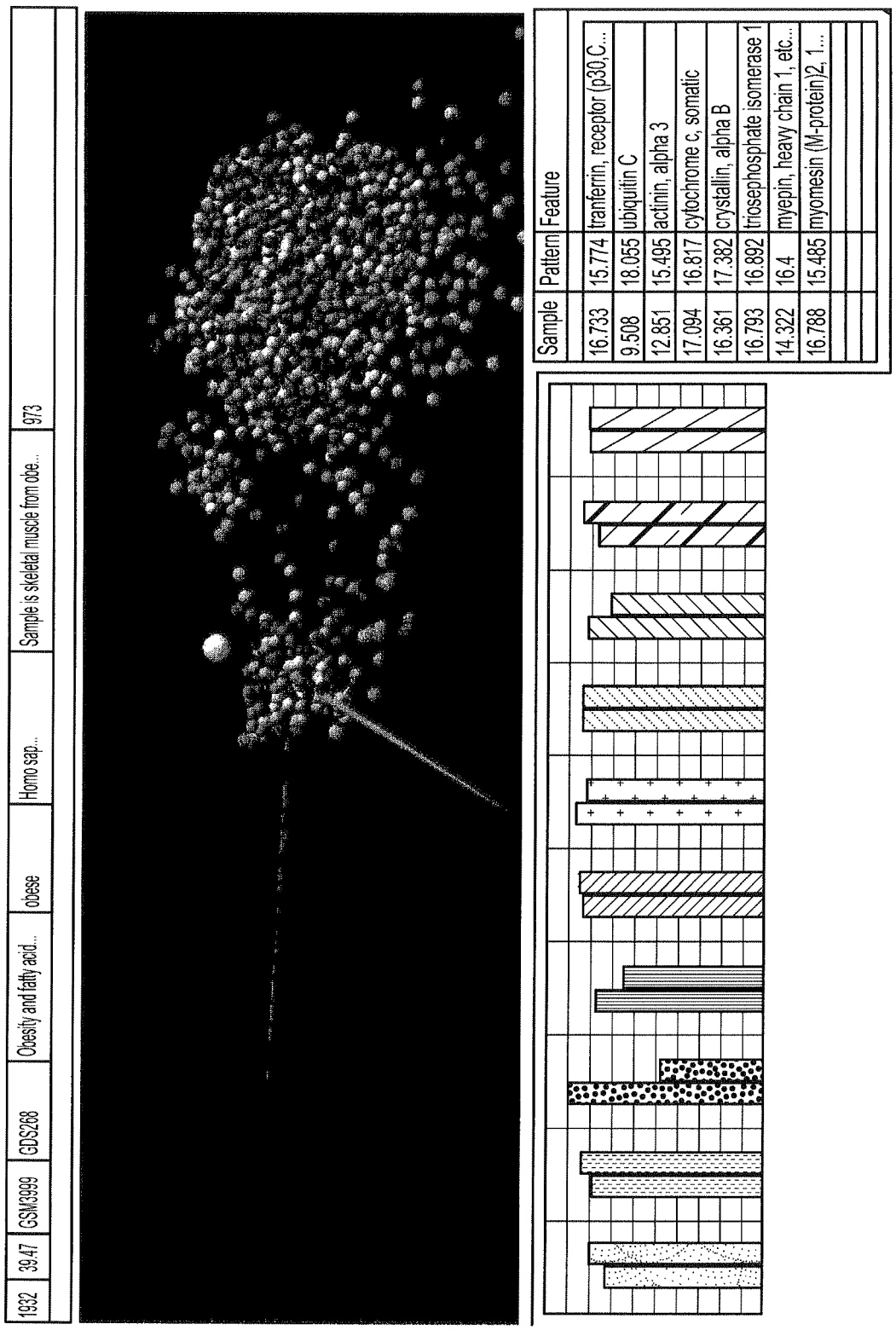
FIG. 16 is a display of an entire database in the spatial model created with an actual data pattern and its use as a database access method. The point of origin in this graphic model is an actual data pattern consisting of 10 chosen genes. The entire database is examined with respect to the values of these 10 genes in each record and the results are projected into the model. The axes are created using principal components analysis on the chosen genes and positioning them with the actual pattern at the origin. It can be seen that a cluster formed at the origin, showing records whose data pattern closely matched those of the chosen pattern. At least two additional clusters show relatedness of groups within the remaining database. Additional information about these groups could be obtained by retrieving the detailed information from their database records. The selected enlarged pink sphere has been used to retrieve its database record and the information is shown in the 'sample' column in lower right, and used to generate the leftmost bars in each pair at left. The comparison bars forming the rightmost of each pair at left are the values from the chosen actual pattern.

Incorporation of an Actual Data Pattern in a Graphic Display of a Database and Use as an Accessing Method A dataset was chosen from the GEO database that contained healthy and diseased muscle tissue. An svm was trained using these examples and the top 10 most important genes were selected using the methods of U.S. application Ser. No. 12/557,344, filed on Sep. 10, 2009, the contents of which are incorporated herein by reference. One of the records was chosen and the values for these top 10 genes were used as an actual data pattern. The database was then searched and the results used to create a graphical model shown in FIG. 16.

The actual data pattern for the 10 chosen genes is the point of origin of the model. The entire database was examined with respect to the values of these 10 genes in each record and the results are projected into the model generated using principal components analysis. A group of samples containing similar data patterns clustered around the origin. It was also seen that there were at least two additional clusters that showed related groups within the remaining database. Additional information about these groups was obtained by selecting records in the graphic and retrieving the detailed information from their database records. The graphic model thereby created a visual index for the associated database.

Example 9

Figure 17:
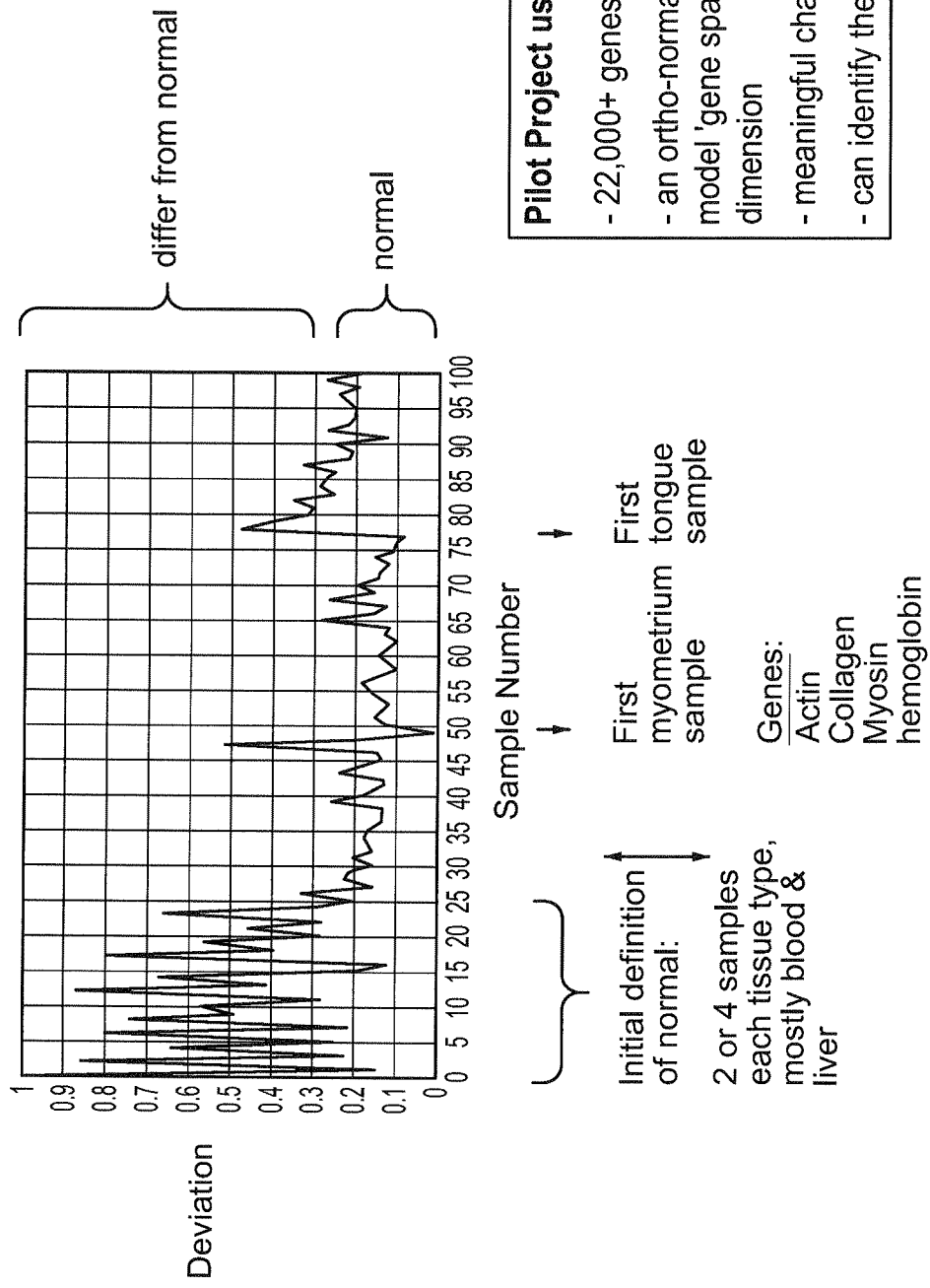
FIG. 17 is a data model for detecting changes in complex data that was built by selecting samples from the GEO database that were selected from normal tissue. An orthonormalization method was used to build a model of gene expression from the samples. The initial build of the model is shown at left and consisted primarily of blood and liver samples. A decrease in spikes was seen in the graph as the range of normal expression was incorporated into the model. With the introduction of the first myometrium sample a large spike is observed, and it was determined that four genes were primarily responsible: increases in actin, collagen and myosin and decreased hemoglobin. This makes scientific sense in the context of transition from blood and liver to a more muscular tissue.

Generation of a Normal Data Model and the Detection of Deviations from Normal Using the Model Normal tissue samples were obtained from the GEO repository, primarily human liver and blood samples. The Gram Schmidt orthonormalization method was used to build a model of normal data from these samples. This created a model of normal gene expression in multi-dimensional space. When presented with additional data samples from a new tissue type, in this case a myometrial sample, the new data did not fit into the model space, and was graphically shown as a spike (see FIG. 17). Mathematically the features responsible for this deviation from the normal model space were determined and ranked. The top ranking changes were found to be increases in actin, collagen and myosin and a decrease in hemoglobin. This is sensible in terms of the new tissue which contains muscle and actin, myosin and collagen are structural components of muscle. Hemoglobin is highly abundant in blood and liver and would be expected to be less so in myometrial tissue. Thus without any examples of what types of deviations might be expected, the normal model was able to identify meaningful changes from normal.

Example 10

Pseudocode

Pseudocode provides a possible implementation of a version of one implementation of the invention in code outline form.

Pseudocode A:

0. Set i = 0
1. Determine a subspace in given feature space, A_i.
2. Create a new subspace by projecting data onto the subspace A_i and onto its orthonormal subspace B_i. B_i thus consists of the remaining feature space once the degree of freedom associated with A_i is removed.
3. Update the feature space.
4. If hyperplanes are not orthonormal, create basis for subspace using hyperplanes via orthonormalization. If there is only one hyperplane, create a second subspace (B_i) orthonormal to the first.
5. Project data onto this subspace A_i and the subspace B_i orthogonal to the projection.
6. Update feature space with A_i or B_i.
7. Optionally, return to #1, setting i = i +1.
8. Create final subspace from orthonormalized set of A_i subspaces.
9. Analyze data using visualization, or structure-revealing computational tools (classification, clustering, etc), or machine learning Pseudocode B:

0. Set i = 0; A_0 and B_0 are empty sets of hyperplanes.
1. i = i + 1; Determine one or more hyperplanes a_i in given feature space F_i
2. Let A_i = A_(i−1) + a_i. That is, add subspace a_i to existing subspace A_(i−1), and orthonormalize resulting A_i.
3. Project data onto this subspace A_i and the subspace B_i orthogonal to the projection.
4. Update feature space with A_i or B_i ( F_i <- A_i OR F_i <- B_i)
5. Optionally, goto #1
6. Create final subspace from orthonormalized set of A_i subspaces.
7. Analyze data using visualization, or structure-revealing computational tools (classification, clustering, etc)

Example 11

Creation of a Prototype Science Dashboard that Alerts and Accesses Databases Using the Graphic Display Models of this Invention A prototype dashboard is shown in FIG. 18. Displayed are hypothesis incorporating models, the entire database display in a modeled subspace, alerting based on pattern matching and display, and the detection of deviation from normal. Each of these used a display and data accessing method described in this invention, incorporated into additional software tools.

Example 12

Computer Infrastructure

Figure 19:
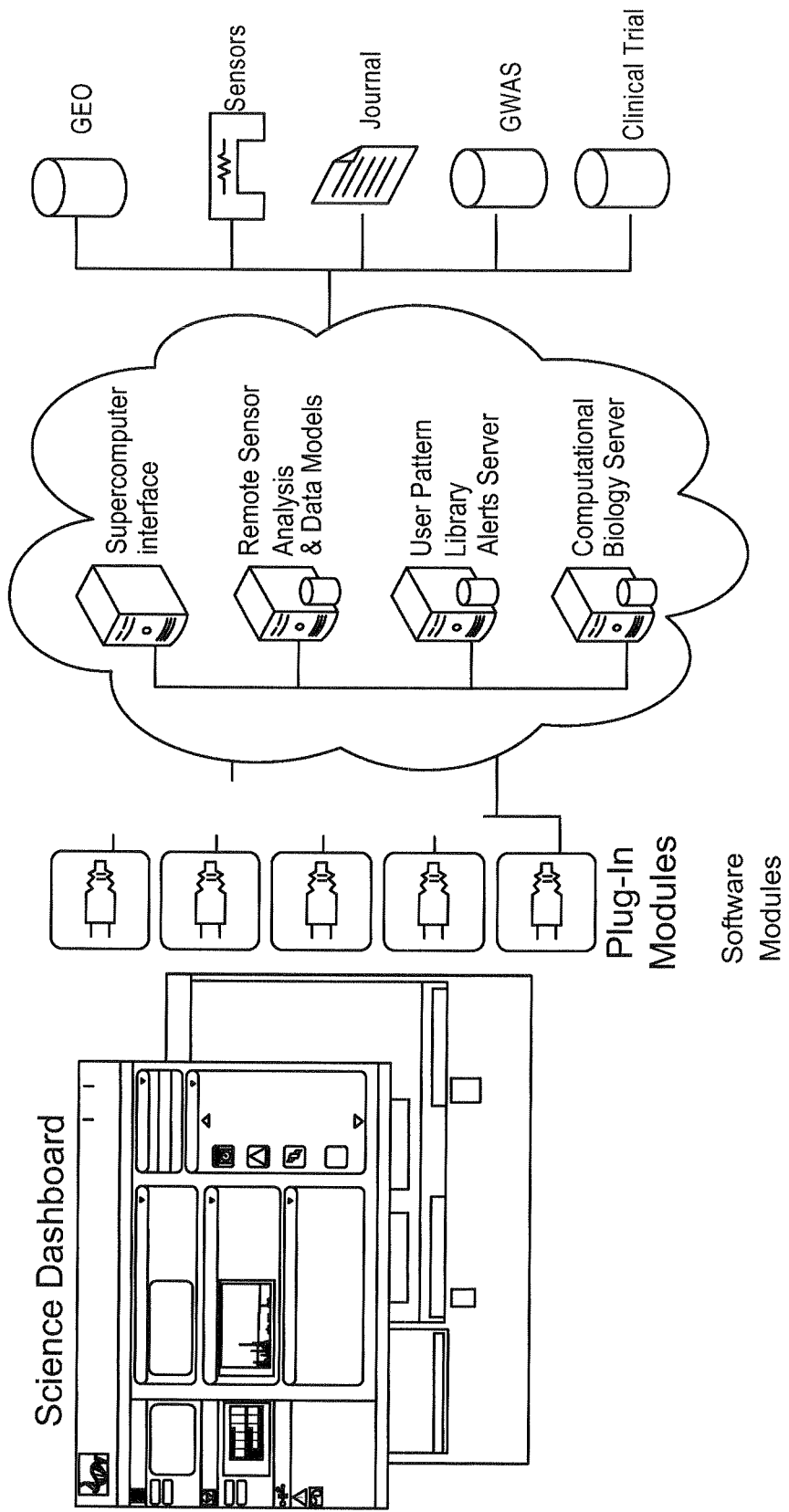
FIG. 19 is an example of computer infrastructure comprising the methods of this invention.

Many types of computer infrastructure are possible that can utilize the methods of the invention. Shown in FIG. 19 is one example of computer architecture that utilizes software in the form of a science dashboard that receives information from remote computer servers. Both local and remote computers may utilize algorithms incorporating the methods of this invention, and may host databases that can be accessed using the graphical indexing methods.

CONCLUSION

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

Aspects of the present invention are capable of considerable modification, alteration, and equivalents in form and function, as will occur to those ordinarily skilled in the pertinent arts having the benefit of this disclosure.

While aspects of the present invention have been described for what are presently considered illustrative implementations, variations of the present invention are intended to cover various modifications and equivalent arrangements included within the spirit and scope of the detailed description provided above.

What is claimed:

1. A method for analysis of a high-dimensional feature space comprising labelled data, comprising:
   generating a first supervised hypersurface and a first vector normal to the first hypersurface using supervised learning techniques on said labelled data;
   generating a second unsupervised hypersurface and a second vector normal to the second hypersurface using unsupervised learning techniques on said labelled data after removing the labels;
   selecting a subspace comprising the supervised hypersurface and unsupervised hypersurface;
   projecting data from the high-dimensional feature space onto the orthonormal basis that spans the selected subspace comprising the first vector normal to the first hypersurface and the second vector normal to the second hypersurface; and
   outputting the projected data into a computer memory.

2. The method of claim 1, wherein the lower-dimensional subspace comprises a new model of the data from the high-dimensional feature space.

3. The method of claim 1, wherein the projected data is used to conduct further analysis of the projected data.

4. The method of claim 3, wherein the further analysis is selected from the group consisting of data discovery, data display, and database exploration.

5. The method of claim 1, wherein the projected data is used to generate a visual data display on a display means.

6. The method of claim 1, wherein the data projected onto the lower dimensional subspace is used to represent an svm or learning machine.

7. The method of claim 6, wherein the data projected onto the lower dimensional subspace is used to represent a combination of an svm or learning machine and an unsupervised learning method in a single visual subspace model.

8. The method of claim 1, wherein the supervised learning techniques is a machine learning solution.

9. A computer program product comprising a non-transitory computer usable medium having control logic stored therein for causing a computer comprising a process to analyze a high-dimensional feature space comprising labelled data, the control logic comprising:
   first computer readable program code means for generating a first supervised hypersurface and a first vector normal to the first hypersurface using supervised learning techniques on said labelled data;
   second computer readable program code means for generating a second unsupervised hypersurface and a second vector normal to the second hypersurface using unsupervised learning techniques on said labelled data after removing the labels;
   third computer readable program code means for selecting a subspace comprising the supervised hypersurface and unsupervised hypersurface;
   fourth computer readable program code means for projecting data from the high-dimensional feature space onto the orthonormal basis that spans the selected subspace comprising the first vector normal to the first hypersurface and the second vector normal to the second hypersurface; and
   fifth computer readable program code means for outputting the projected data on an output device.

10. A method for projecting high-dimensional data from a high-dimensional data space onto a lower-dimensional subspace comprising:
    generating one or more axes from high-dimensional data comprising labelled data, wherein said axes include at least one vector chosen from the following: a vector normal to a hypersurface in said high-dimensional data space, said hypersurface being derived using supervised means based on a vector created from a hypothetical data pattern, or derived using supervised means based on a vector selected from an actual data pattern;
    generating one or more axes from high-dimensional data, wherein said axes include at least one vector normal to an unsupervised hypersurface in said high-dimensional data space, said unsupervised hypersurface being derived using unsupervised means on said labelled data after removing the labels;
    orthonormalizing the vectors with respect to one another and projecting the high-dimensional data onto said orthonormalized vectors to form a lower-dimensional subspace; and
    outputting the lower-dimensional subspace into a computer memory.

11. The method of claim 10, wherein the projected data is used to generate a visual data display on a display means.

12. The method of claim 10, wherein the data projected onto the lower dimensional subspace is used to represent an svm or learning machine, or a combination of an svm or learning machine and an unsupervised learning method.

13. The method of claim 10, wherein the supervised means are machine learning techniques.

14. A computer program product comprising a non-transitory computer usable medium having control logic stored therein for causing a computer comprising a process to analyze a high-dimensional feature space, the control logic comprising:
    first computer readable program code means for generating one or more axes from high-dimensional data comprising labelled data, wherein said axes include at least one vector chosen from the following: a vector normal to a hypersurface in said high-dimensional data space, said hypersurface being derived using supervised means based on a vector created from a hypothetical data pattern, or derived using supervised means based on a vector selected from an actual data pattern;
    second computer readable program code means for generating one or more axes from high-dimensional data, wherein said axes include at least one vector normal to an unsupervised hypersurface in said high-dimensional data space, said unsupervised hypersurface being derived using unsupervised means on said labelled data after removing the labels;
    third computer readable program code means for orthonormalizing the vectors with respect to one another and projecting the high-dimensional data onto said orthonormalized vectors to form lower-dimensional subspaces; and
    fourth computer readable program code means for outputting the lower-dimensional subspaces into a computer memory.

15. A graphic method of indexing a database comprising:
generating a lower-dimensional subspace using data from the database;
projecting data from the database onto the lower-dimensional subspace
graphically representing data from the database in the subspace;
enabling access of database records by selection of the graphical representation of the data from the database; and
outputting the generated index of the database into a computer memory.

16. A method for detecting deviations in data from a complex typical state and identifying data features responsible for the deviations from the typical state, comprising:
generating a first hypersurface and a first vector normal to the first hypersurface and a second hypersurface and a second vector normal to the second hypersurface derived from data consisting of typical data from a high-dimensional feature space using learning methods consisting of unsupervised learning methods;
selecting a lower-dimensional subspace comprising the hypersurfaces;
projecting data from the high-dimensional feature space onto the orthonormal basis that spans the selected subspace comprising the first vector normal to the first hypersurface and the second vector normal to the second hypersurface to generate a lower-dimensional typical model;
comparing additional data samples to the lower-dimensional typical model;
identifying which data features of the compared data samples do not match the typical model; and
outputting the projected typical model into a computer memory.

17. The method of claim 16, wherein the typical model is progressively generated as examples are added to the model by calculating a vector orthogonal to a hypersurface in the high-dimensional feature space that reflects the differences of the data features of the example from the model, and incorporating that vector into the typical model subspace.

18. The method of claim 16, wherein the method is used to detect deviations from typical in data sets.

19. The method of claim 16, wherein the method is used to monitor equipment.

20. The method of claim 16, wherein the method is used to conduct data surveillance.

21. The method of claim 1, wherein hypothetical or actual data patterns are used to create a lower-dimensional subspace.

22. The method of claim 10, wherein the projected data is used to conduct further analysis of the projected data.

23. The method of claim 10, wherein the further analysis is selected from the group consisting of data discovery, data display, and database exploration.

* * * * *

UNITED STATES PATENT AND TRADEMARK OFFICE
CERTIFICATE OF CORRECTION

| | | |
|---|---|---|
| PATENT NO. | : 8,812,274 B2 | Page 1 of 1 |
| APPLICATION NO. | : 12/767533 | |
| DATED | : August 19, 2014 | |
| INVENTOR(S) | : Hemant Virkar et al. | |

It is certified that error appears in the above-identified patent and that said Letters Patent is hereby corrected as shown below:

On the title page item (73) should read:

(73) Assignee: Hemant Virkar, Gaithersburg, MD

Signed and Sealed this
Twenty-seventh Day of January, 2015

Michelle K. Lee
*Deputy Director of the United States Patent and Trademark Office*